US012418083B2

(12) United States Patent
Ding et al.

(10) Patent No.: US 12,418,083 B2
(45) Date of Patent: Sep. 16, 2025

(54) PHASE SHIFTER, ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Yi Ding, Beijing (CN); Haocheng Jia, Beijing (CN); Wenxue Ma, Beijing (CN); Hao Guo, Beijing (CN); Yan Lu, Beijing (CN); Jing Wang, Beijing (CN); Yong Li, Beijing (CN); He Liu, Beijing (CN); Feng Qu, Beijing (CN); Chuncheng Che, Beijing (CN); Zhifeng Zhang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/288,901

(22) PCT Filed: Feb. 24, 2023

(86) PCT No.: PCT/CN2023/078077
§ 371 (c)(1),
(2) Date: Oct. 30, 2023

(87) PCT Pub. No.: WO2024/174217
PCT Pub. Date: Aug. 29, 2024

(65) Prior Publication Data

US 2025/0079674 A1 Mar. 6, 2025

(51) Int. Cl.
*H01P 1/18* (2006.01)
*H01Q 1/50* (2006.01)

(52) U.S. Cl.
CPC ............... *H01P 1/182* (2013.01); *H01Q 1/50* (2013.01)

(58) Field of Classification Search
CPC . H01P 1/182; H01P 1/184; H01P 1/18; H01Q 1/50; H01Q 21/065; H01Q 3/36
See application file for complete search history.

(56) References Cited

U.S. PATENT DOCUMENTS

2012/0235872 A1 9/2012 Lewis et al.
2021/0175635 A1 6/2021 Brobston et al.

FOREIGN PATENT DOCUMENTS

CN 106450763 A 2/2017
CN 112768851 A 5/2021
(Continued)

OTHER PUBLICATIONS

Fang et al. English translation of CN115250641A (Year: 2022).*
Kataie et al. English translation of CN114583453A (Year: 2022).*

*Primary Examiner* — Daniel D Chang
(74) *Attorney, Agent, or Firm* — Nath, Goldberg & Meyer; Joshua B. Goldberg

(57) ABSTRACT

The present disclosure provides a phase shifter, an antenna and an electronic device, and belongs to the field of communication technology. The phase shifter includes a plurality of phase shifting units, a first power division network and a second power division network; each phase shifting unit includes a first transmission structure and a second transmission structure; the first power division network includes a first feeding port and a plurality of second feeding ports; the second power division network includes a third feeding port and a plurality of fourth feeding ports; and the first transmission structure of the phase shifting unit is electrically connected to one second feeding port; the second
(Continued)

transmission structure of the phase shifting unit is electrically connected to one fourth feeding port.

20 Claims, 21 Drawing Sheets

(56) References Cited

FOREIGN PATENT DOCUMENTS

| | | | | | |
|---|---|---|---|---|---|
| CN | 112510372 | B | | 8/2021 | |
| CN | 113675551 | A | | 11/2021 | |
| CN | 113937500 | A | | 1/2022 | |
| CN | 114006163 | A | | 2/2022 | |
| CN | 114430111 | A | | 5/2022 | |
| CN | 114583453 | A | * | 6/2022 | .............. H01P 1/184 |
| CN | 114830433 | A | | 7/2022 | |
| CN | 113690554 | B | | 8/2022 | |
| CN | 115152089 | A | | 10/2022 | |
| CN | 115250641 | A | * | 10/2022 | .............. H01P 1/181 |
| CN | 114094338 | B | | 11/2022 | |

* cited by examiner

PHASE SHIFTER, ANTENNA AND ELECTRONIC DEVICE

This is a National Phase Application filed under 35 U.S.C. 371 as a national stage of PCT/CN2023/078077, filed Feb. 24, 2023, the content of which is hereby incorporated by reference in its entirety.

TECHNICAL FIELD

The present disclosure relates to the field of communication technology, and in particular to a phase shifter, an antenna and an electronic device.

BACKGROUND

A liquid crystal phase shifter has disadvantages of large loss compared with other digital or mechanical phase shifters, since on one hand, a liquid crystal material has a large loss, and on the other hand, a glass base material also has a larger loss than a conventional PCB (printed circuit board) or some other dielectric base materials. The liquid crystal phase shifter adopts a liquid crystal packaging process with the PCB or some other dielectric base materials, which has much poorer maturity and mass production than a glass-based process. Therefore, at present, the liquid crystal phase shifter is mainly designed on a glass substrate by integrally processing and molding components (including signal transmission lines, liquid crystal capacitors and the like), and then a signal transmission between the liquid crystal phase shifter and an antenna or a radio frequency device on a substrate made of other material is realized by coupling, waveguide or the like.

SUMMARY

The present invention is directed to solve at least one of the problems in the prior art, and provides a phase shifter, an antenna and an electronic device.

In a first aspect, embodiments of the present disclosure provide a phase shifter, including a plurality of phase shifting units, a first power division network and a second power division network; each phase shifting unit includes a first transmission structure and a second transmission structure; the first power division network includes a first feeding port and a plurality of second feeding ports; the second power division network includes a third feeding port and a plurality of fourth feeding ports; and the first transmission structure of the phase shifting unit is electrically connected to one second feeding port; the second transmission structure of each phase shifting unit is electrically connected to one fourth feeding port.

In some embodiments, the phase shifter includes a first dielectric substrate and a second dielectric substrate opposite to each other; the phase shifting unit further includes a phase adjustment structure connected between the first transmission structure and the second transmission structure; and the phase adjustment structure includes a first electrode layer on a side of the first dielectric substrate close to the second dielectric substrate, a second electrode layer on a side of the second dielectric substrate close to the first dielectric substrate, and a tunable dielectric layer between the first electrode layer and the second electrode layer; orthographic projections of the first electrode layer and the second electrode layer on the first dielectric substrate at least partially overlap with each other.

In some embodiments, the first electrode layer includes a first transmission line and a second transmission line arranged side by side; the second electrode layer includes a plurality of first patch electrodes arranged side by side along an extending direction of the first transmission line; orthographic projections of the first transmission line and the second transmission line on the first dielectric substrate at least partially overlap with an orthographic projection of each first patch electrode on the first dielectric substrate.

In some embodiments, the first electrode layer includes a first transmission line and a plurality of first branches electrically connected to the first transmission line, the plurality of first branches are arranged at intervals and are connected on one side of an extending direction of the first transmission line; the second electrode layer includes a second transmission line and a plurality of second branches electrically connected to the second transmission line, and the plurality of second branches are arranged at intervals and are connected on one side of an extending direction of the second transmission line; an orthographic projection of one first branch on the first dielectric substrate at least partially overlaps with an orthographic projection of one corresponding second branch on the first dielectric substrate.

In some embodiments, the first electrode layer includes a first reference electrode and a second reference electrode arranged side by side, and a signal electrode between the first reference electrode and the second reference electrode; the second electrode layer includes a plurality of first patch electrodes arranged side by side along an extending direction of the signal electrode; and orthographic projections of the first patch electrodes on the first dielectric substrate overlap with an orthographic projection of any one of the first reference electrode, the second reference electrode and the signal electrode on the first dielectric substrate.

In some embodiments, the first electrode layer includes a first reference electrode and a second reference electrode arranged side by side, and a signal electrode between the first reference electrode and the second reference electrode; the second electrode layer includes a plurality of first patch electrodes arranged side by side along an extending direction of the signal electrode; any first patch electrode includes a first sub-patch and a second sub-patch disconnected from each other; an orthographic projection of the first sub-patch on the first dielectric substrate at least partially overlap with orthographic projections of the first reference electrode and the signal electrode on the first dielectric substrate; an orthographic projection of the second sub-patch on the first dielectric substrate at least partially overlap with orthographic projections of the second reference electrode and the signal electrode on the first dielectric substrate.

In some embodiments, the first electrode layer includes a first reference electrode and a second reference electrode arranged side by side, a plurality of third branches arranged at intervals and electrically connected to the first reference electrode and on one side of an extending direction of the first reference electrode, and a plurality of fourth branches arranged at intervals and electrically connected to the second reference electrode and on one side of an extending direction of the second reference electrode; the plurality of third branches and the plurality of fourth branches are between the first reference electrode and the second reference electrode; and the second electrode layer includes a signal electrode, and fifth branches and sixth branches electrically connected to the signal electrode and on two sides of an extending direction of the signal electrode; an orthographic projection of one third branch on the first dielectric substrate at least partially overlaps with an orthographic projection of one corresponding fifth branch on the first dielectric substrate, and an orthographic projection of one fourth branch on the first dielectric substrate at least partially overlaps with an orthographic projection of one corresponding sixth branch on the first dielectric substrate.

In some embodiments, the first reference electrode of one of the phase shifting units adjacent to each other is shared by the second reference electrode of the other one of the phase shifting units.

In some embodiments, each phase shifting unit further includes a third reference electrode on a side of the first dielectric substrate away from the first electrode layer; the first electrode layer includes a signal transmission line and a fourth reference electrode which are arranged side by side; the second electrode layer includes a plurality of first patch electrodes arranged side by side along an extending direction of the signal transmission line; an orthographic projection of each of the signal transmission line and the fourth reference electrode on the first dielectric substrate at least partially overlaps with orthographic projections of the plurality of first patch electrodes on the first dielectric substrate.

In some embodiments, every two adjacent phase shifting units form a group of phase shifting units; in a group of phase shifting units, two fourth reference electrodes are between two signal transmission lines, or the fourth reference electrode in each phase shifting unit is on a side of the signal transmission line away from the adjacent phase shifting unit, or only one fourth reference electrode is between two signal transmission lines.

In some embodiments, two fourth reference electrodes of the same group of phase shifting units are between two signal transmission lines; in a group of phase shifting units, the fourth reference electrodes are shared.

In some embodiments, each phase shifting unit further includes a third reference electrode on a side of the first dielectric substrate away from the first electrode layer; the first electrode layer includes a fourth reference electrode and a fifth reference electrode which are arranged side by side, and a signal transmission line between the fourth reference electrode and the fifth reference electrode; the second electrode layer includes first patch electrodes arranged side by side along an extending direction of the signal transmission line; an orthographic projection of each of the signal electrode, the fourth reference electrode and the fifth reference electrode on the first dielectric substrate at least partially overlaps with orthographic projections of the first patch electrodes on the first dielectric substrate.

In some embodiments, every two adjacent phase shifting units form a group of phase shifting units; in a group of phase shifting units, the fourth reference electrode of one phase shifting unit is shared by the fifth reference electrode of the other phase shifting unit.

In some embodiments, the signal transmission line includes a main structure and a plurality of branches connected on one side of an extending direction of the main structure; an orthographic projection of one branch on the first dielectric substrate overlaps with an orthographic projection of one corresponding first patch electrode on the first dielectric substrate.

In some embodiments, the fourth reference electrode and the third reference electrode are electrically connected to each other through a connection via extending through the first dielectric substrate.

In some embodiments, the connection via is filled with a connection electrode, and the fourth reference electrode and the third reference electrode are electrically connected to each other through the connection electrode.

In some embodiments, the fourth reference electrode and the third reference electrode are electrically connected to each other by a side trace on a lateral side of the first dielectric substrate.

In a second aspect, embodiments of the present disclosure provide an antenna, which includes the phase shifter in any one of the above embodiments.

In some embodiments, the antenna further includes a radiating structure electrically connected to the phase shifter.

In some embodiments, the antenna includes any one of a radiating antenna, a dipole, and a slot antenna.

In a third aspect, embodiments of the present disclosure provide an electronic device, which includes the antenna in any one of the above embodiments.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Before describing the embodiments of the present disclosure, it should be noted that a BALUN (balance-unbalance) component is a three-port device that can be applied in a microwave radio frequency device, and is a radio frequency transmission line transformer that converts a matching input into a differential input, and can be used for exciting a differential line, an amplifier, a wideband antenna, a balanced mixer, a balanced frequency multiplier and a modulator, a phase shifter, and any circuit design that requires transmission of signals with a same amplitude and a 180° phase difference on two lines. Two outputs of the BALUN component have a same amplitude and opposite phases. In the frequency domain, this means that there is a phase difference of 180° between the two outputs; in the time domain, this means that a voltage of one balanced output is a negative value of the other balanced output.

Figure 1:
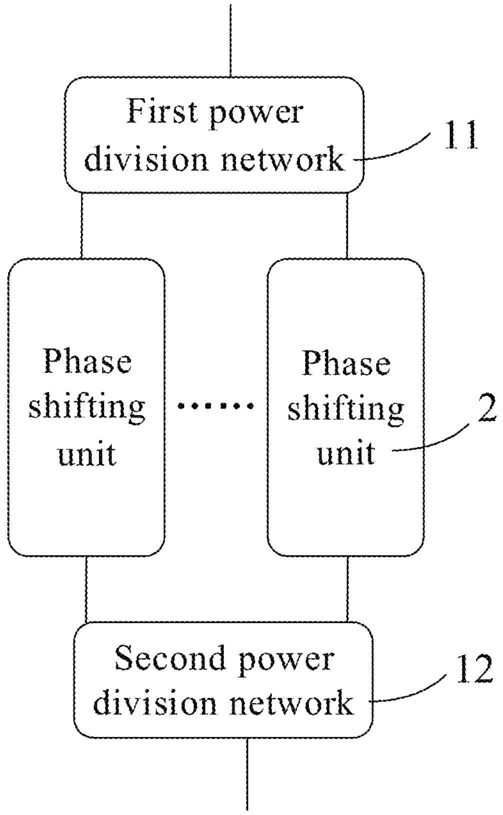
FIG. 1 is a schematic diagram of a structure of a phase shifter according to embodiments of the present disclosure.
Figure 2:
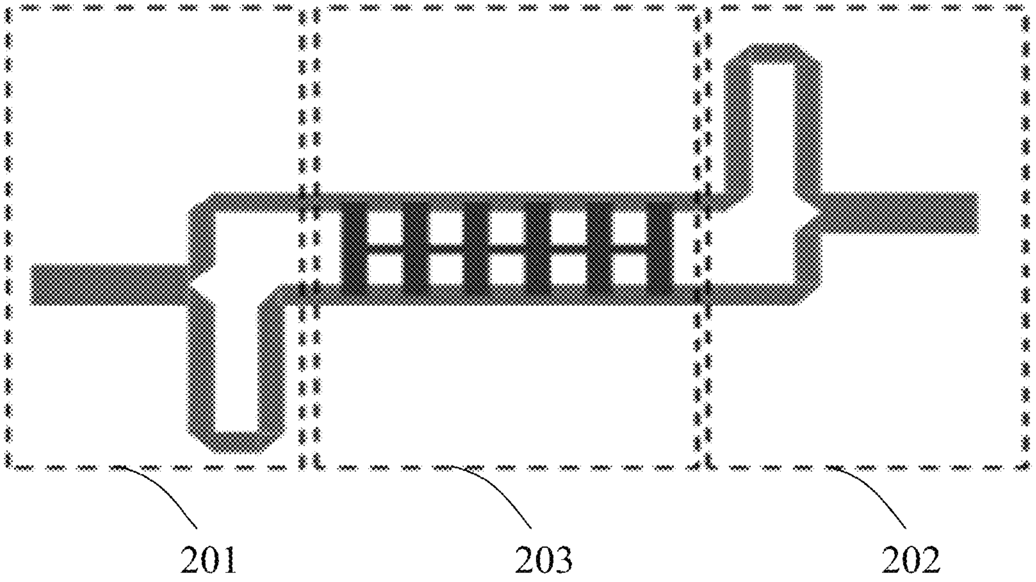
FIG. 2 is a schematic diagram of a structure of a phase shifting unit according to embodiments of the present disclosure.

In a first aspect, FIG. 1 is a schematic diagram of a structure of a phase shifter according to embodiments of the present disclosure. FIG. 2 is a schematic diagram of a structure of a phase shifting unit 2 according to embodiments of the present disclosure. As shown in FIGS. 1 and 2, embodiments of the present disclosure provide a phase shifter, including a plurality of phase shifting units 2 connected in parallel. Specifically, the phase shifter includes the plurality of phase shifting units 2, a first power division network 11, and a second power division network 12. Each phase shifting unit 2 has a first transmission structure 201, a second transmission structure 202, and a phase adjustment structure 203 connected between the first transmission structure 201 and the second transmission structure 202; the first power division network 11 includes a first feeding port and a plurality of second feeding ports; the second power division network 12 includes a third feeding port and a plurality of fourth feeding ports; the first transmission structure 201 of each phase shifting unit 2 is electrically connected to one second feeding port; the second transmission structure 202 of each phase shifting unit 2 is electrically connected to one fourth feeding port. For example: the second feeding ports of the first power division network 11 are connected to the first transmission structures 201 of the phase shifting units 2 in a one-to-one correspondence, and the fourth feeding ports of the second power division network 12 are connected to the second transmission structures 202 of the phase shifting units 2 in a one-to-one correspondence.

In the embodiments of the present disclosure, a power division is performed on the microwave signal through the first power division network 11 and the second power division network 12, so that the signal strength in each phase shifting unit 2 can be reduced, and the overall power capacity of the phase shifter can be improved.

In some examples, the phase shifter includes a first dielectric substrate 100 and a second dielectric substrate 200 disposed opposite to each other. Any phase adjustment structure may include a first electrode layer arranged on a side of the first dielectric substrate 100 close to the second dielectric substrate 200, a second electrode layer arranged on a side of the second dielectric substrate 200 close to the first dielectric substrate 100, and a tunable dielectric layer positioned between the first electrode layer and the second electrode layer; orthographic projections of the first electrode layer and the second electrode layer on the first dielectric substrate 100 at least partially overlap with each other. In the phase shifting unit 2, one of the first transmission structure 201 and the second transmission structure 202 is used as a feed-in end of the electromagnetic wave, and the other is used as a feed-out end of the electromagnetic wave. In the embodiments of the present disclosure, the first transmission structure 201 is used as a feed-in end of the electromagnetic wave, and the second transmission structure 202 is used as a feed-out end of the electromagnetic wave. The tunable dielectric layer in the embodiments of the present disclosure includes, but is not limited to, a liquid crystal layer 24. The liquid crystal layer 24 is only used as the tunable dielectric layer in the embodiments of the present disclosure, as an example. When a bias voltage is applied to the first electrode layer and the second electrode layer, a dielectric constant of the liquid crystal layer 24 may be changed to adjust a phase of the microwave signal fed in by the first transmission structure 201, and the electromagnetic wave with the adjusted phase is fed out by the second transmission structure 202.

In the following, in order to make a person skilled in the art better understand the structure of the phase shifter in the embodiments of the present disclosure, the phase shifters including two phase shifting units 2 and four phase shifting units 2 are taken as examples for description, respectively. Alternatively, the number of the phase shifting units 2 is not limited to 2 and 4, and may be specifically designed according to specific situations. Several different configurations are given for the phase shifting unit 2 in the following examples.

Figure 3:
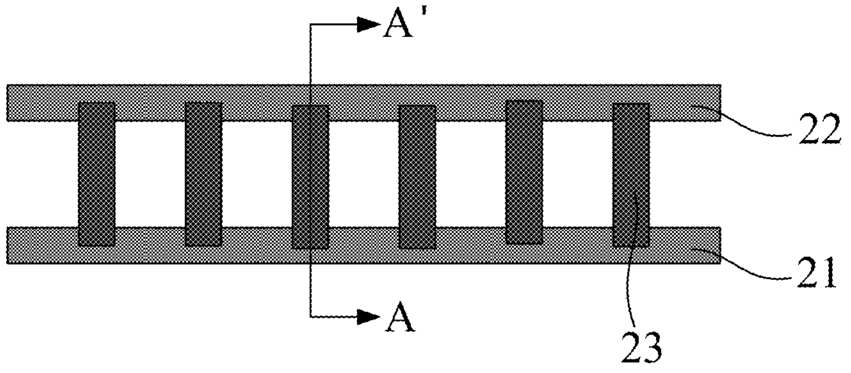
FIG. 3 is a top view of a phase adjustment structure in a first example of embodiments of the present disclosure.
Figure 4:
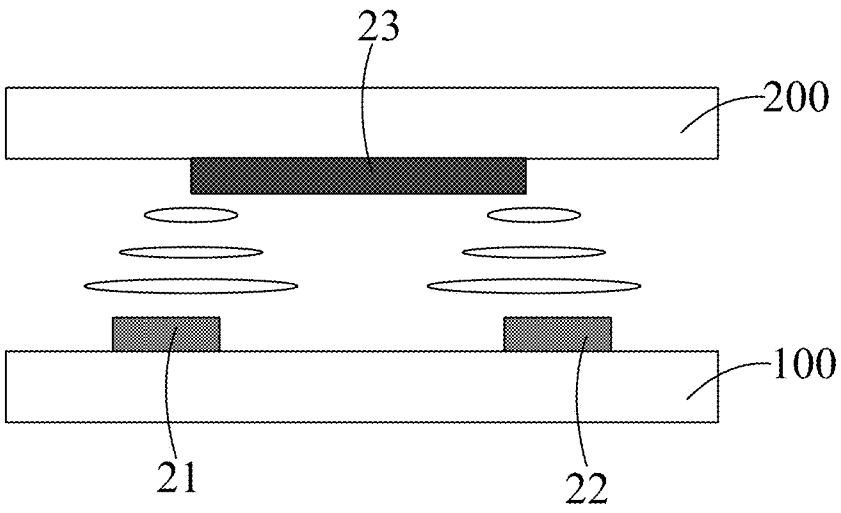
FIG. 4 is a cross-sectional view along a line A-A' in FIG. 3.

In a first example, FIG. 3 is a top view of a phase adjustment structure in a first example of embodiments of the present disclosure. FIG. 4 is a cross-sectional view of the phase adjustment structure along a line A-A' in FIG. 3. As shown in FIGS. 3 and 4, the first electrode layer in the phase adjustment structure 203 includes a first transmission line 21 and a second transmission line 22 arranged side by side on the first dielectric substrate at a side close to the liquid crystal layer 24; the first transmission line 21 and the second transmission line 22 extend in the same direction, e.g. a first direction and are arranged side by side in a second direction. The second electrode layer includes a plurality of first patch electrodes 23 arranged side by side in the first direction. Orthographic projections of the first transmission line 21 and the second transmission line 22 on the first dielectric substrate 100 at least partially overlap with an orthographic projection of any one of the first patch electrodes 23 on the first dielectric substrate 100.

The first transmission structure 201 and the second transmission structure 202 in the phase adjustment structure 203 may each be a one-to-two power divider, that is, each include a main line and two branches; the two branches of the first transmission structure 201 are electrically connected to one ends of the first transmission line 21 and the second transmission line 22, respectively; the two branches of the second transmission structure 202 are electrically connected to the other ends of the first transmission line 21 and the second transmission line 22, respectively, the main line of the first transmission structure 201 is electrically connected to a second feeding port of the first power division network 11, and the main line of the second transmission structure 202 is electrically connected to a fourth feeding port of the second power division network 12.

Further, the first transmission structure 201 and the second transmission structure 202 in the present embodiment each include, but are not limited to, a BALUN component.

In some examples, when the phase shifter operates in a low-frequency band, it is further necessary to provide a ground electrode layer on a side of the first dielectric substrate 100 away from the first electrode layer. Alternatively, if the phase shifter operates in a high-frequency band, it is also necessary to provide a ground electrode layer on a side of the first dielectric substrate 100 away from the first electrode layer.

Figure 5:
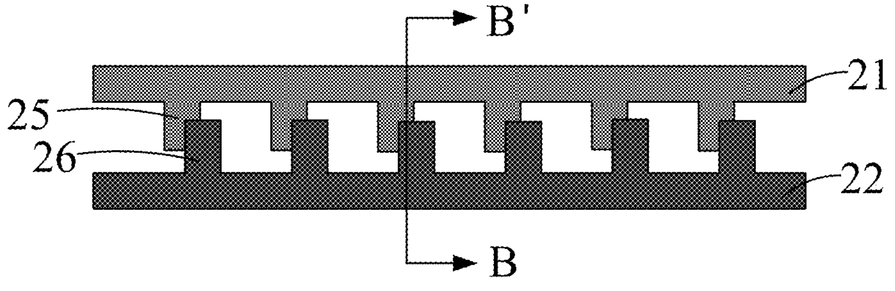
FIG. 5 is a top view of a phase adjustment structure in a second example of embodiments of the present disclosure.
Figure 6:
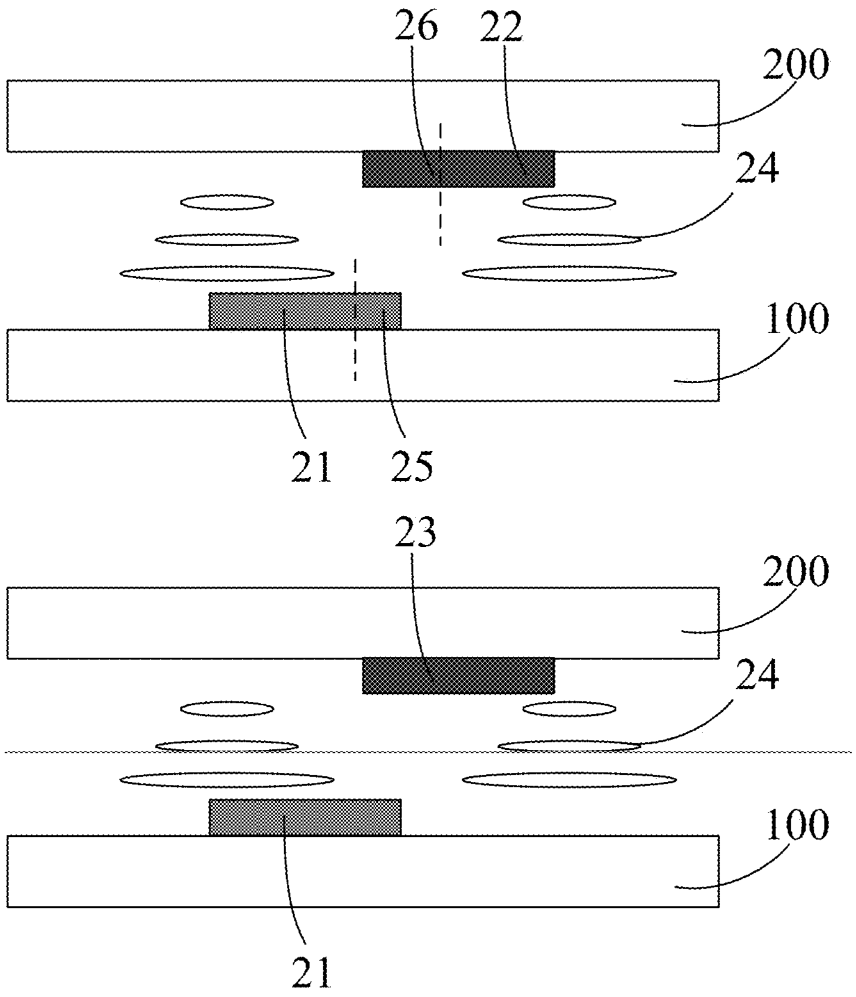
FIG. 6 is a cross-sectional view along a line B-B' in FIG. 5.

In a second example, FIG. 5 is a top view of a phase adjustment structure in a second example of embodiments of the present disclosure. FIG. 6 is a cross-sectional view of the phase adjustment structure along a line B-B' in FIG. 5. As shown in FIGS. 5 and 6, the structure in the second example is substantially the same as that in the first example except that in the second example, the first electrode layer of the phase adjustment structure 203 includes the first transmission line 21 on a side of the first dielectric substrate 100 close to the liquid crystal layer 24, and a plurality of first branches 25 electrically connected to the first transmission line 21; wherein the plurality of first branches 25 are located on the same side of an extending direction of the first transmission line 21. The second electrode layer includes the second transmission line 22 on a side of the second dielectric substrate 200 close to the liquid crystal layer 24, and a plurality of second branches 26 electrically connected to the second transmission line 22; the plurality of second branches 26 are located on the same side of an extending direction of the second transmission line 22. Further, orthographic projections of the first branches 25 and the second branches 26 on the first dielectric substrate 100 are located between orthographic projections of the first transmission line 21 and the second transmission line 22 on the first dielectric substrate 100. And the plurality of first branches 25 are arranged in one-to-one correspondence with the plurality of second branches 26. An orthographic projection of one first branch 25 on the first dielectric substrate 100 overlaps with an orthographic projection of one corresponding second branch 26 on the first dielectric substrate 100.

The remaining structures in the second example may adopt the same structures as in the first example, and therefore, the description thereof is not repeated.

Figure 7:
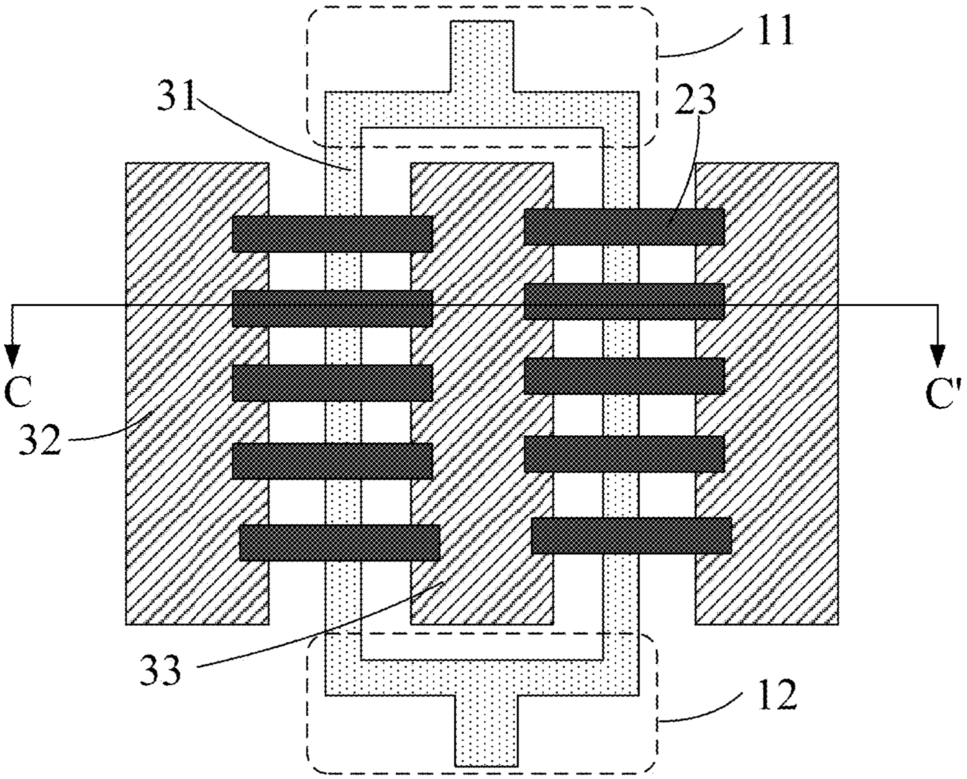
FIG. 7 is a top view of a phase shifter in a third example of embodiments of the present disclosure.
Figure 8:
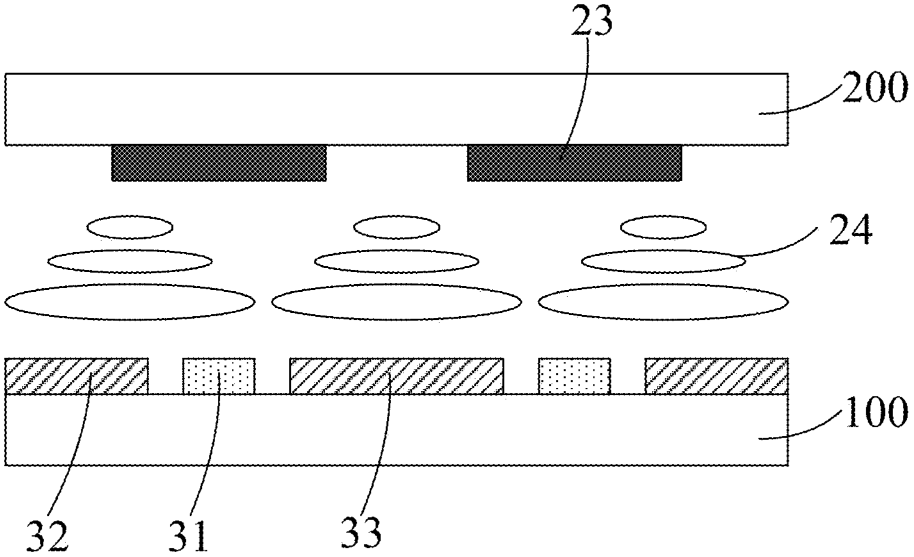
FIG. 8 is a cross-sectional view along a line C-C' in FIG. 7.

In a third example: FIG. 7 is a top view of a phase shifter in a third example of embodiments of the present disclosure. FIG. 8 is a cross-sectional view along a line C-C' in FIG. 7. As shown in FIGS. 7 and 8, the phase shifter in this example includes two phase shifting units 2 connected in parallel, the phase adjustment structure 203 of each phase shifting unit 2 is a coplanar waveguide (CPW) transmission line, the first electrode layer in the phase adjustment structure 203 includes a first reference electrode 32, a second reference electrode 33 and a signal electrode 31 between the first reference electrode 32 and the second reference electrode 33, which are arranged side by side on the first dielectric substrate at a side close to the liquid crystal layer 24. As an example, the first reference electrode 32, the second reference electrode 33, and the signal electrode 31 all extend in the first direction and are arranged side by side in the second direction. The second electrode layer includes a plurality of first patch electrodes 23 arranged side by side in an extending direction of the signal electrode 31; orthographic projections of the first patch electrodes 23 on the first dielectric substrate 100 overlap with an orthographic projection of any one of the first reference electrode 32, the second reference electrode 33 and the signal electrode 31 on the first dielectric substrate 100. Two ends of the signal electrode 31 are respectively used as the first transmission structure 201 and the second transmission structure 202, one end of the signal electrode 31 is electrically connected to a second feeding port of the first power division network 11, and the other end of the signal electrode 31 is electrically connected to a fourth feeding port of the second power division network 12.

In some examples, with continued reference to FIGS. 7 and 8, the first reference electrode 32 of one of the two phase shifting units 2 of the phase shifter is shared by the second reference electrode 33 of the other of the two phase shifting units 2, which is simple in structure and can effectively eliminate the number of bias voltage lines.

In some examples, the first reference electrode 32, the second reference electrode 33, and the signal electrode 31 are disposed in the same layer, and may be made of a same material. Further, the first power division network 11 and the second power division network 12 may also be arranged in the same layer as the first reference electrode 32, the second reference electrode 33 and the signal electrode 31. In this way, lightweight and thinness of the phase shifter is easily realized.

Figure 9:
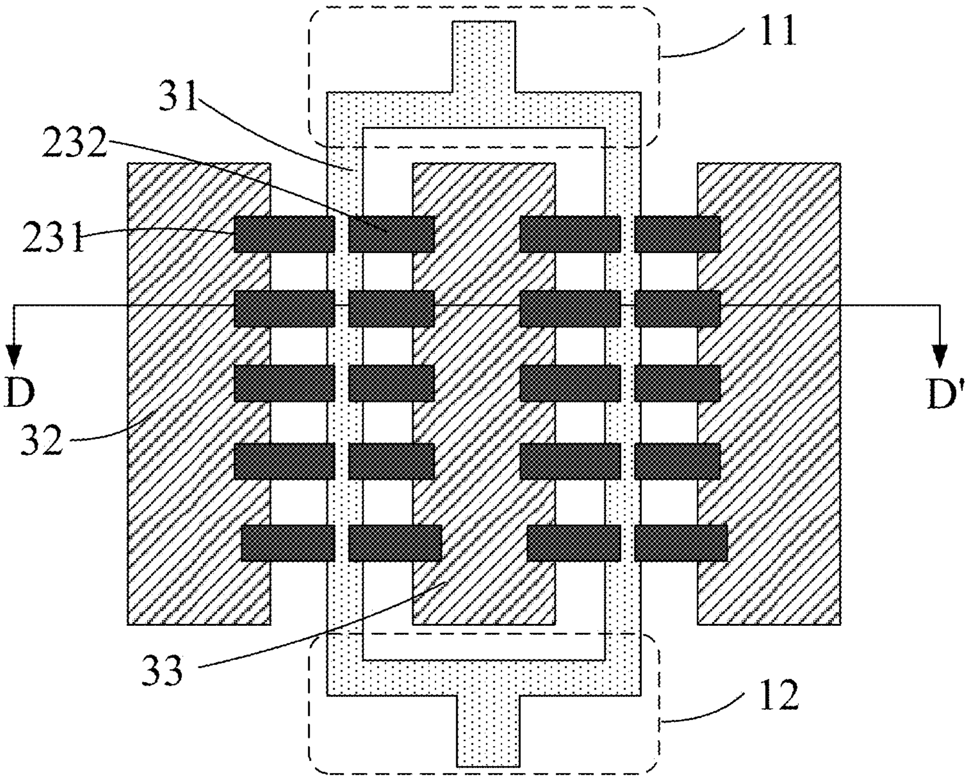
FIG. 9 is a top view of another phase shifter in a third example of embodiments of the present disclosure.
Figure 10:
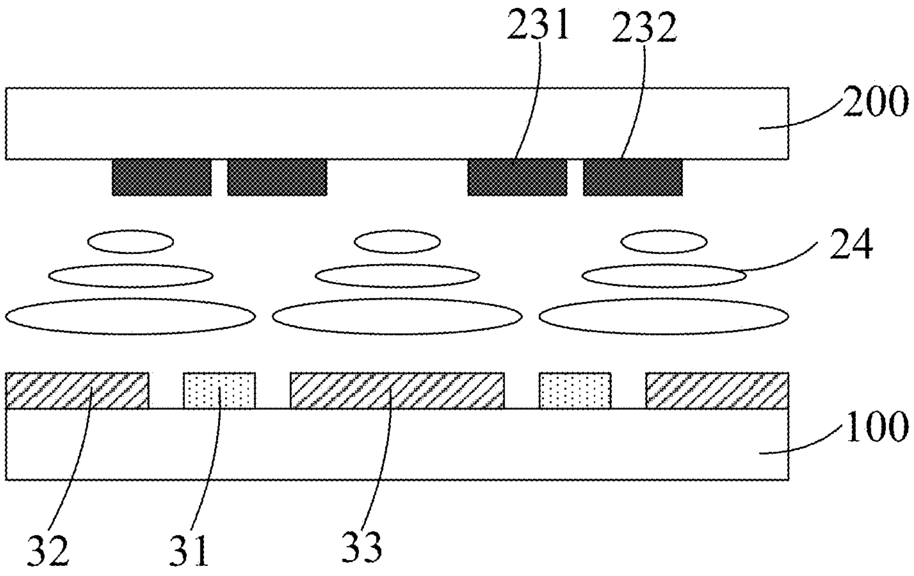
FIG. 10 is a cross-sectional view along a line D-D' in FIG. 9.

In some examples, FIG. 9 is a top view of another phase shifter in a third example of embodiments of the present disclosure. FIG. 10 is a cross-sectional view along a line D-D' in FIG. 9. Referring to FIGS. 9 and 10, each first patch electrode 23 may include a first sub-patch 231 and a second sub-patch 232 arranged side by side and disconnected in the second direction, and an orthographic projection of the first sub-patch 231 on the first dielectric substrate 100 at least partially overlaps with orthographic projections of the first reference electrode 32 and the signal electrode 31 on the first dielectric substrate 100, and an orthographic projection of the second sub-patch 232 on the first dielectric substrate 100 at least partially overlaps with orthographic projections of the second reference electrode 33 and the signal electrode 31 on the first dielectric substrate 100. In this way, each of the first sub-patches 231 forms overlapping capacitors with the first reference electrode 32 and the signal electrode 31, respectively, and each of the second sub-patches 232 forms overlapping capacitors with the second reference electrode 33 and the signal electrode 31, respectively, thereby realizing various phase selections of the phase shifter.

Figure 11:
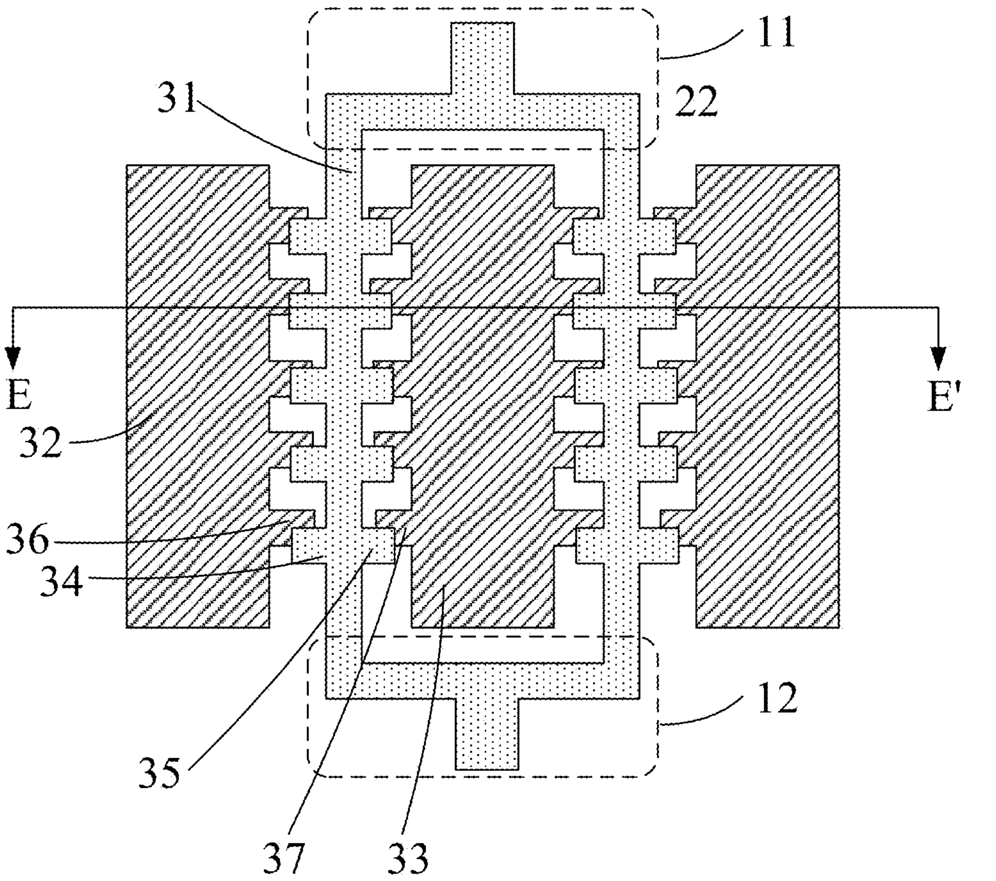
FIG. 11 is a top view of a phase shifter in a fourth example of embodiments of the present disclosure.
Figure 12:
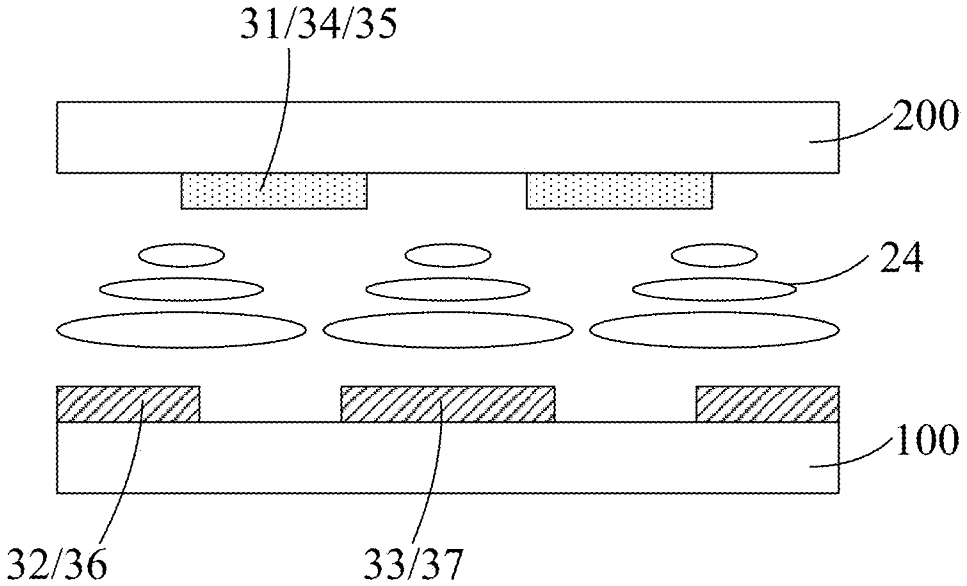
FIG. 12 is a cross-sectional view along a line E-E' in FIG. 11.

In a fourth example, FIG. 11 is a top view of a phase shifter in a fourth example of embodiments of the present disclosure. FIG. 12 is a cross-sectional view along a line E-E' in FIG. 11. As shown in FIGS. 11 and 12, the phase shifter in this example includes two phase shifting units 2 connected in parallel, the phase adjustment structure 203 of each phase shifting unit 2 employs CPW transmission lines in different planes. The phase adjustment structure 203 includes a first reference electrode 32 and a second reference electrode 33 which extend along the first direction and are arranged side by side along the second direction, a plurality of third branches 34 which are electrically connected to the first reference electrode 32 and are arranged at intervals on a side of an extending direction of the first reference electrode 32, and a plurality of fourth branches 35 which are electrically connected to the second reference electrode 33 and are arranged at intervals on a side of an extending direction of the second reference electrode 33; the third branches 34 and the fourth branches 35 are located between the first reference electrode 32 and the second reference electrode 33. The second electrode layer includes a signal electrode 31, and fifth and sixth branches 36 and 37 electrically connected to the signal electrode 31 and located on both sides of an extending direction of the signal electrode 31. For example: the third branches 34 and the fifth branches 36 are arranged in a one-to-one correspondence manner, and orthographic projections of a third branch 34 and a fifth branch 36 which are arranged correspondingly on the first dielectric substrate 100 at least partially overlap with each other; the fourth branches 35 and the sixth branches 37 are arranged in a one-to-one correspondence manner, and orthographic projections of a fourth branch 35 and a sixth branch 37 which are arranged correspondingly on the first dielectric substrate 100 at least partially overlap with each other.

In some examples, the signal electrode 31, the fifth branches 36 and the sixth branches 37 are connected to each other to have a one-piece structure, that is, the signal electrode 31, the fifth branches 36 and the sixth branches 37 may be formed in a single process, so that the cost can be effectively saved.

In some examples, the first power division network 11 and the second power division network 12 are both disposed on the second dielectric substrate 200 and disposed in the same layer as the signal electrode 31, and are made of the same material. In this way, the lightweight and thinness of the phase shifter is easily realized.

In some examples, with continued reference to FIGS. 11 and 12, the first reference electrode 32 of one of the two phase shifting units 2 of the phase shifter is shared by the second reference electrode 33 of the other of the two phase shifting units 2, which is simple in structure and can effectively reduce the number of bias voltage lines.

Figure 13:
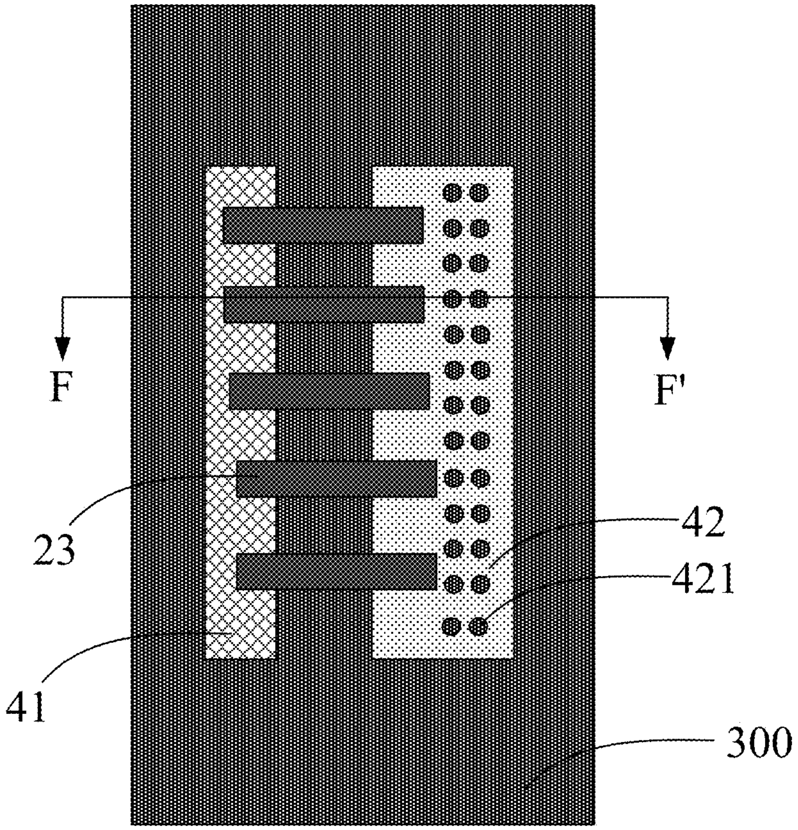
FIG. 13 is a top view of a phase shifting unit in a fifth example of embodiments of the present disclosure.
Figure 14:
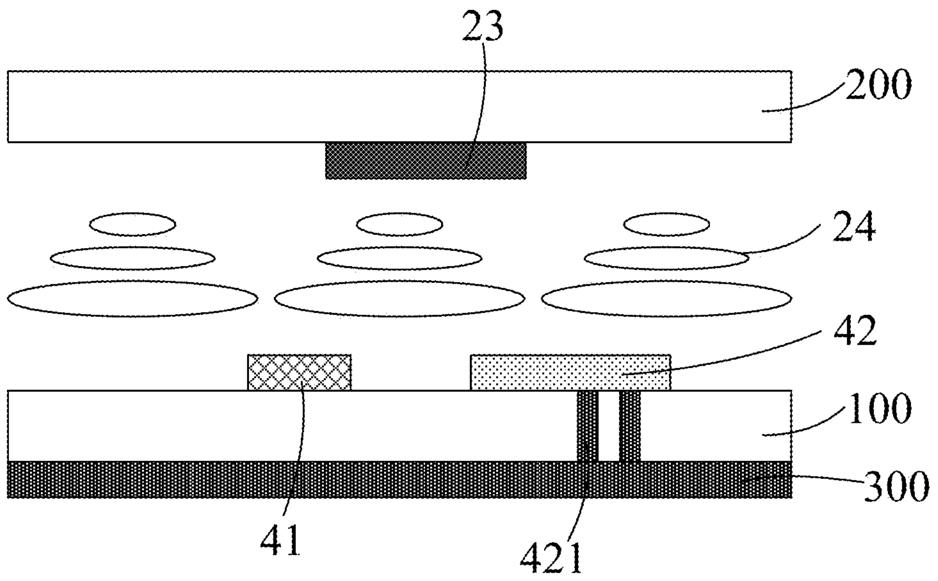
FIG. 14 is a cross-sectional view along a line F-F' in FIG. 13.
Figure 15:
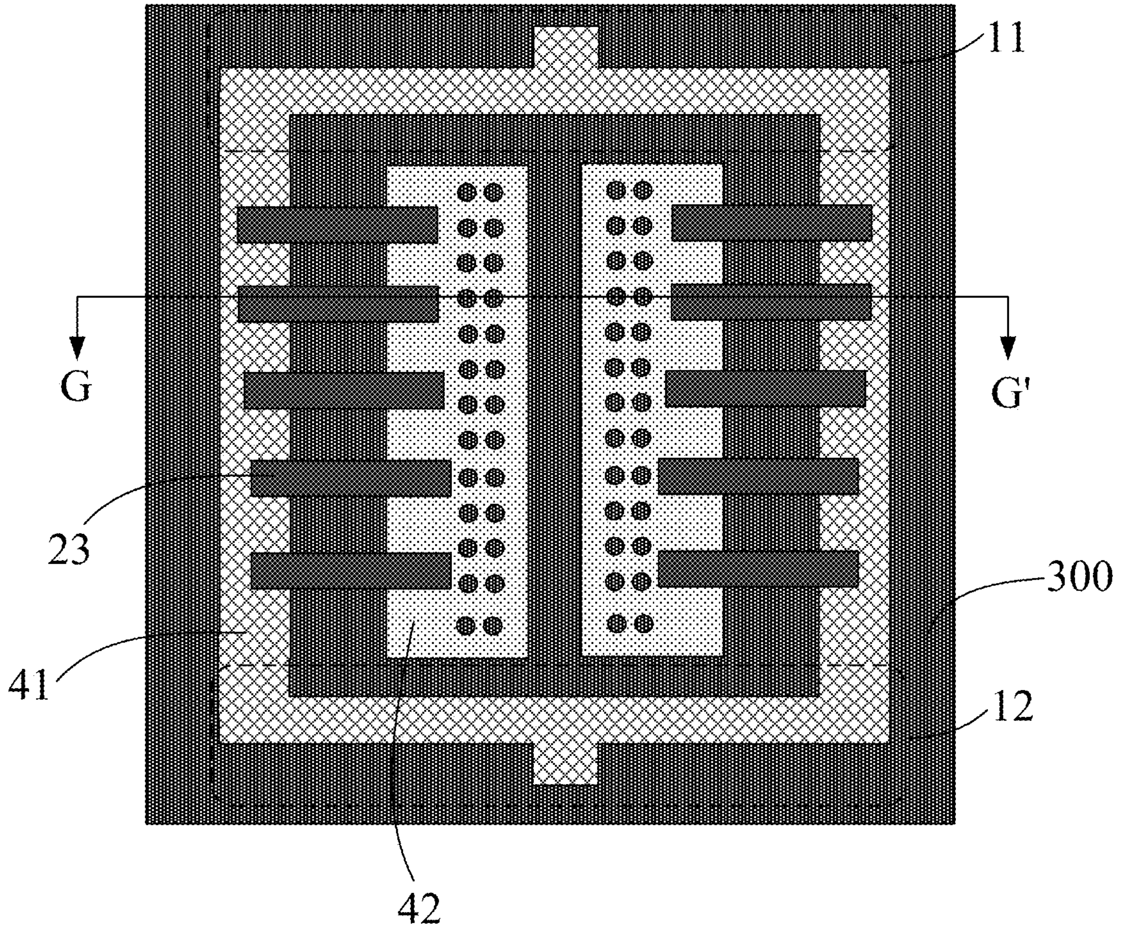
FIG. 15 is a top view of a phase shifter in a fifth example of embodiments of the present disclosure.
Figure 16:
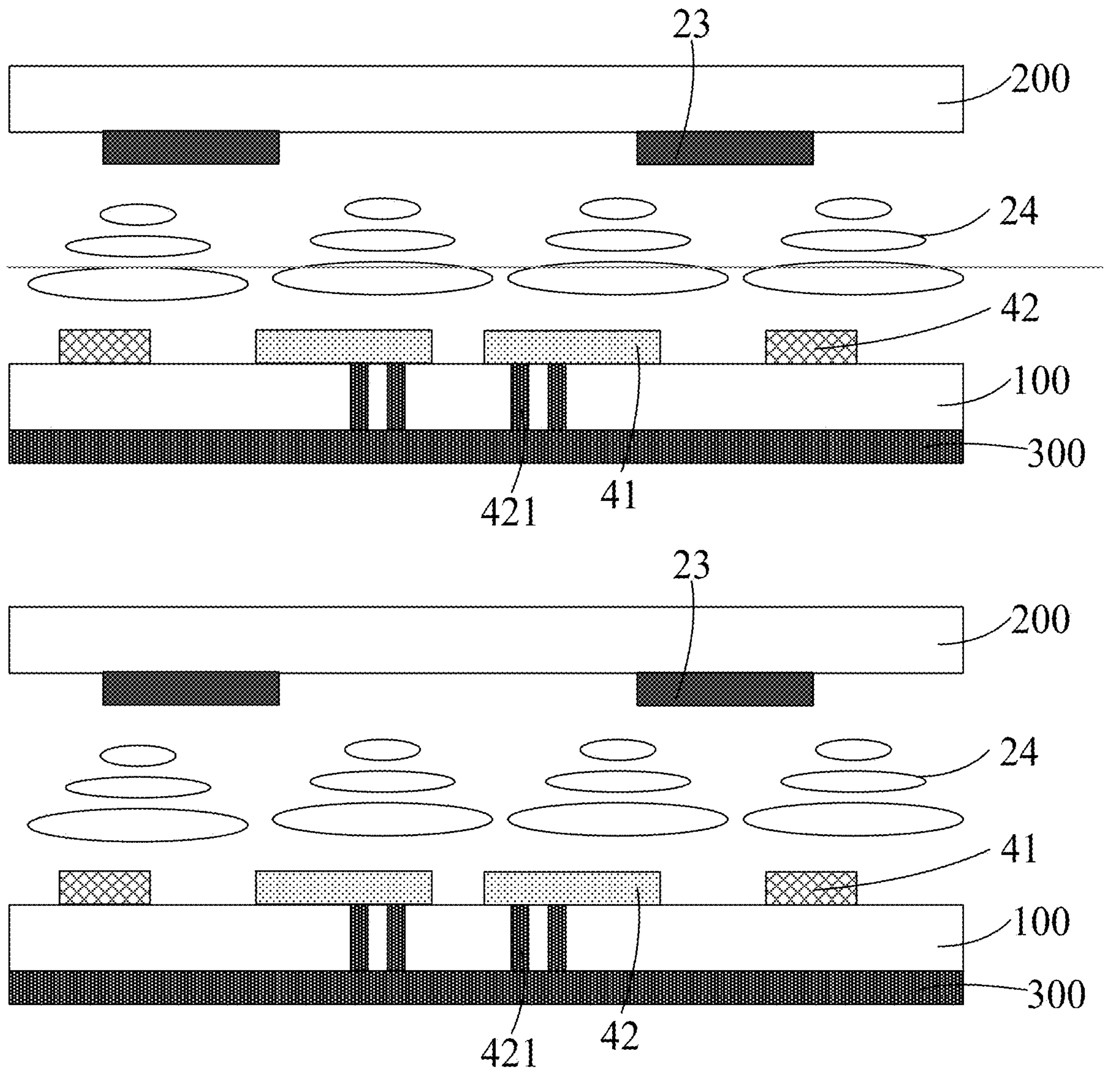
FIG. 16 is a cross-sectional view along a line G-G' in FIG. 15.

In a fifth example: FIG. 13 is a top view of a phase shifting unit 2 in a fifth example of embodiments of the present disclosure. FIG. 14 is a cross-sectional view along a line F-F' in FIG. 13. FIG. 15 is a top view of a phase shifter in a fifth example of embodiments of the present disclosure. FIG. 16 is a cross-sectional view along a line G-G' in FIG. 15. As shown in FIGS. 13 to 16, the phase shifter includes two phase shifting units 2 connected in parallel, each phase shifting unit 2 includes not only the first electrode layer and the second electrode layer described above, but also a third reference electrode 300 located on a side of the first dielectric substrate 100 away from the liquid crystal layer 24. The phase adjustment structure 203 in each phase shifting unit 2 is a single transmission line structure, and the first electrode layer of the phase adjustment unit includes a signal transmission line 41 and a fourth reference electrode 42 extending in the first direction and arranged side by side in the second direction. The second electrode layer includes a plurality of first patch electrodes 23 arranged side by side in the first direction. Orthographic projections of the signal transmission line 41 and the fourth reference electrode 42 on the first dielectric substrate 100 both at least partially overlap with orthographic projections of the first patch electrodes 23 on the first dielectric substrate 100. Two opposite ends of the signal transmission line 41 are respectively used as the first transmission structure 201 and the second transmission structure 202 of the phase shifting unit 2, that is, one end of the signal transmission line 41 is electrically connected to a second feeding port of the first power division network 11, and the other end is electrically connected to a fourth feeding port of the second power division network 12.

In this example, the microwave signal is transmitted through the signal transmission line 41 and passes through the signal transmission line 41 and the first patch electrodes 23, and the fourth reference electrode 42 and the first patch electrodes 23 form overlapping capacitors to adjust the phase of the microwave signal.

In some examples, the third reference electrode 300 and the fourth reference electrode 42 are both ground electrodes, and the fourth reference electrode 42 may be electrically connected to the third reference electrode 300 through connection vias extending through the first dielectric substrate 100. In such an example, the number of bias voltage lines can be effectively reduced.

Further, the connection vias may be filled with a conductive material, such as a metal material, to form connection electrodes 421. At this time, the third reference electrode 300 and the fourth reference electrode 42 are electrically connected to each other through the connection electrodes 421 in the connection vias. Further, in order to ensure good electrical connection between the third reference electrode 300 and the fourth reference electrode 42, the connection vias may be arranged in an array.

Figure 17:
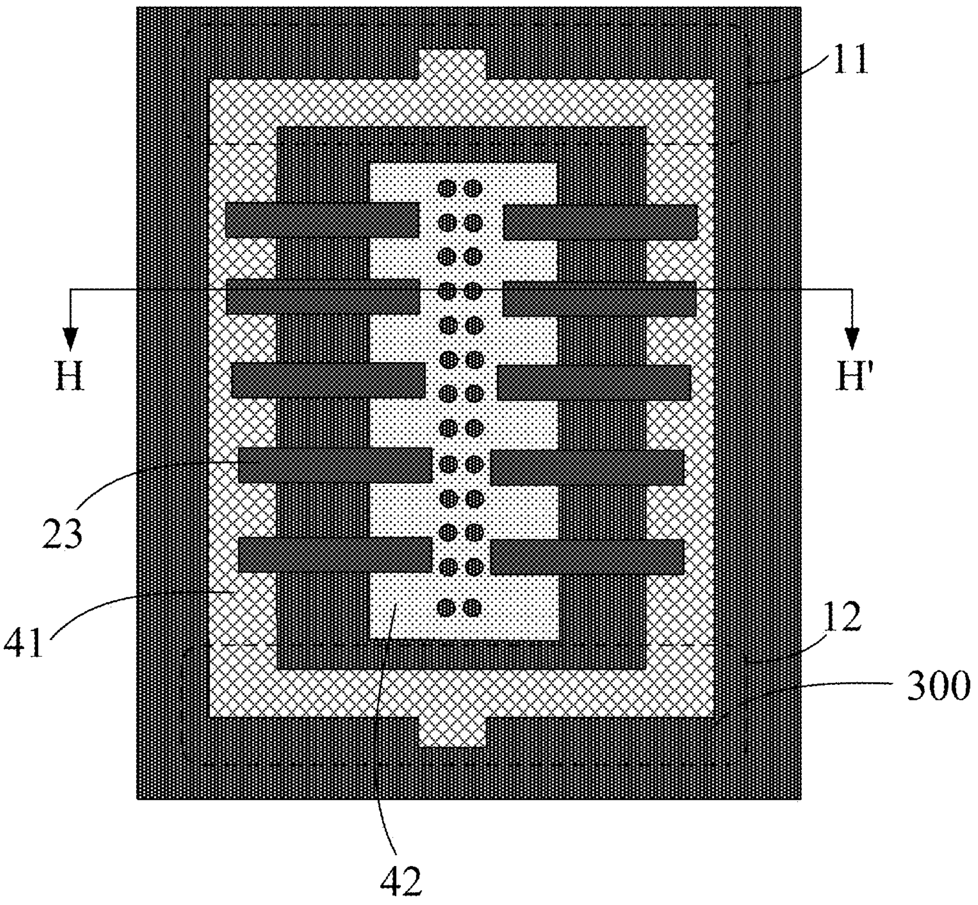
FIG. 17 is a top view of another phase shifter in a fifth example of embodiments of the present disclosure.
Figure 18:
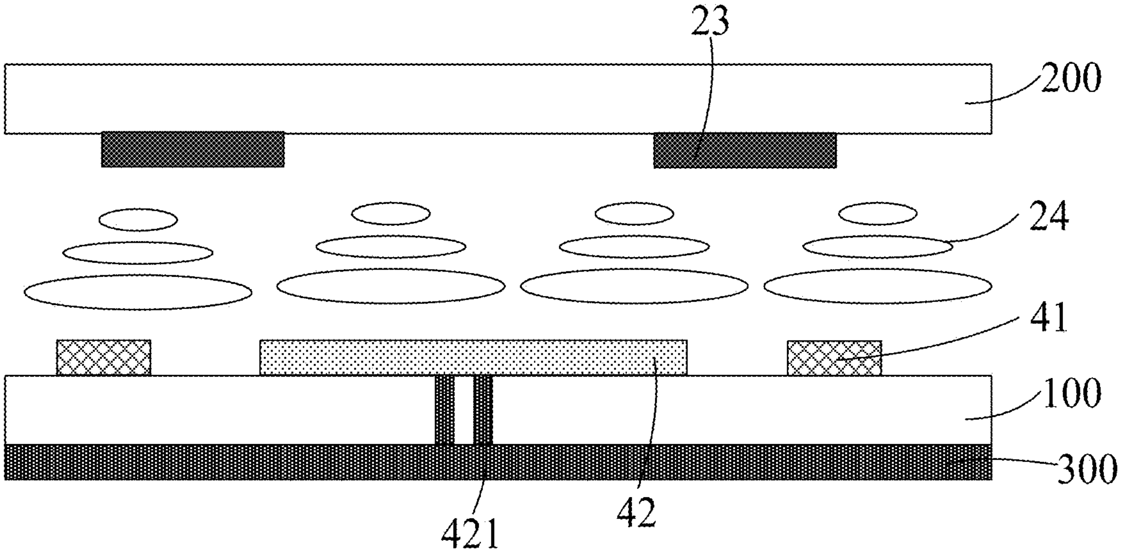
FIG. 18 is a cross-sectional view along a line H-H' in FIG. 17.

In some examples, FIG. 17 is a top view of another phase shifter in a fifth example of embodiments of the present disclosure. FIG. 18 is a cross-sectional view along a line H-H' in FIG. 17. As shown in FIGS. 17 and 18, every two phase shifting units 2 in the phase shifter form one group, and the fourth reference electrodes 42 of the two phase shifting units 2 are shared. Thus, the whole structure of the phase shifter is more compact.

Figure 19:
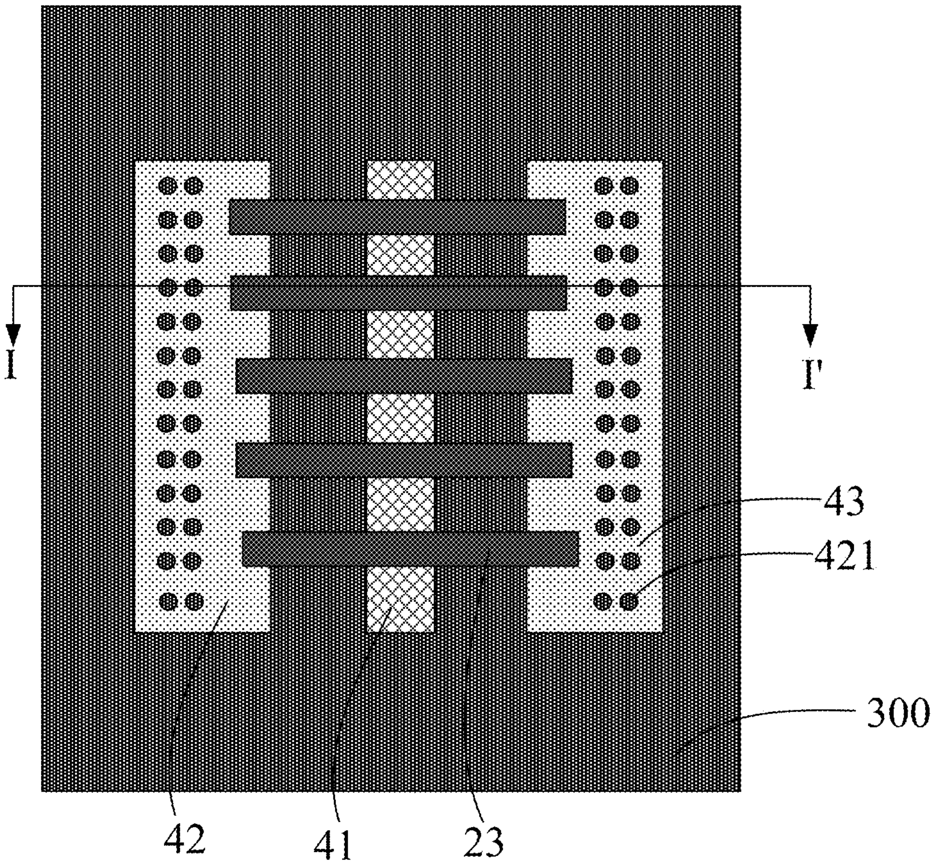
FIG. 19 is a top view of a phase shifting unit in a sixth example of embodiments of the present disclosure.
Figure 20:
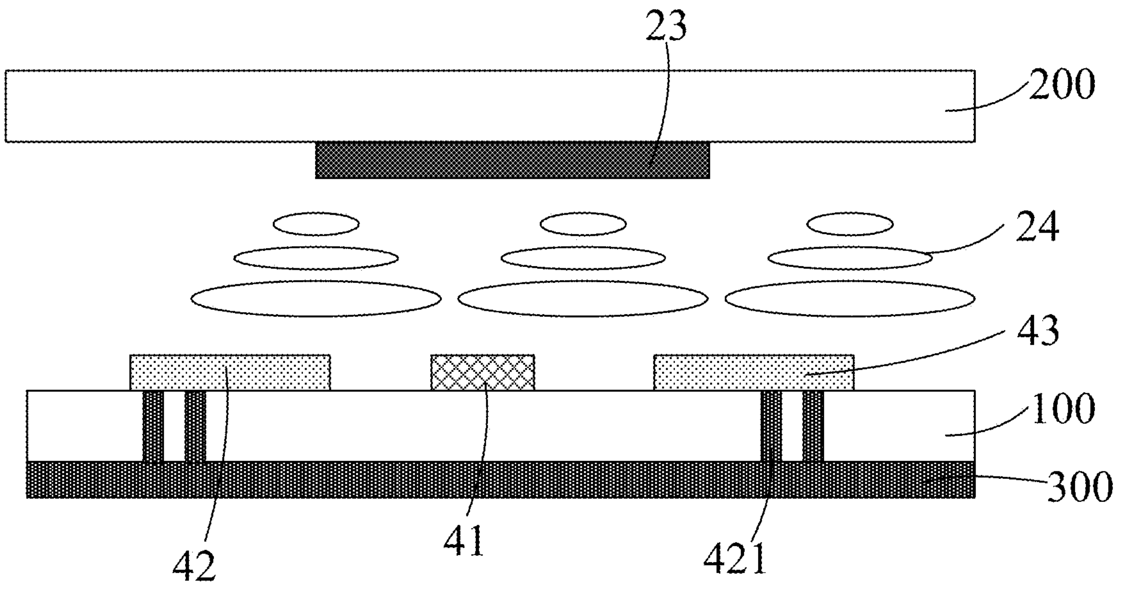
FIG. 20 is a cross-sectional view along a line I-I' in FIG. 19.
Figure 21:
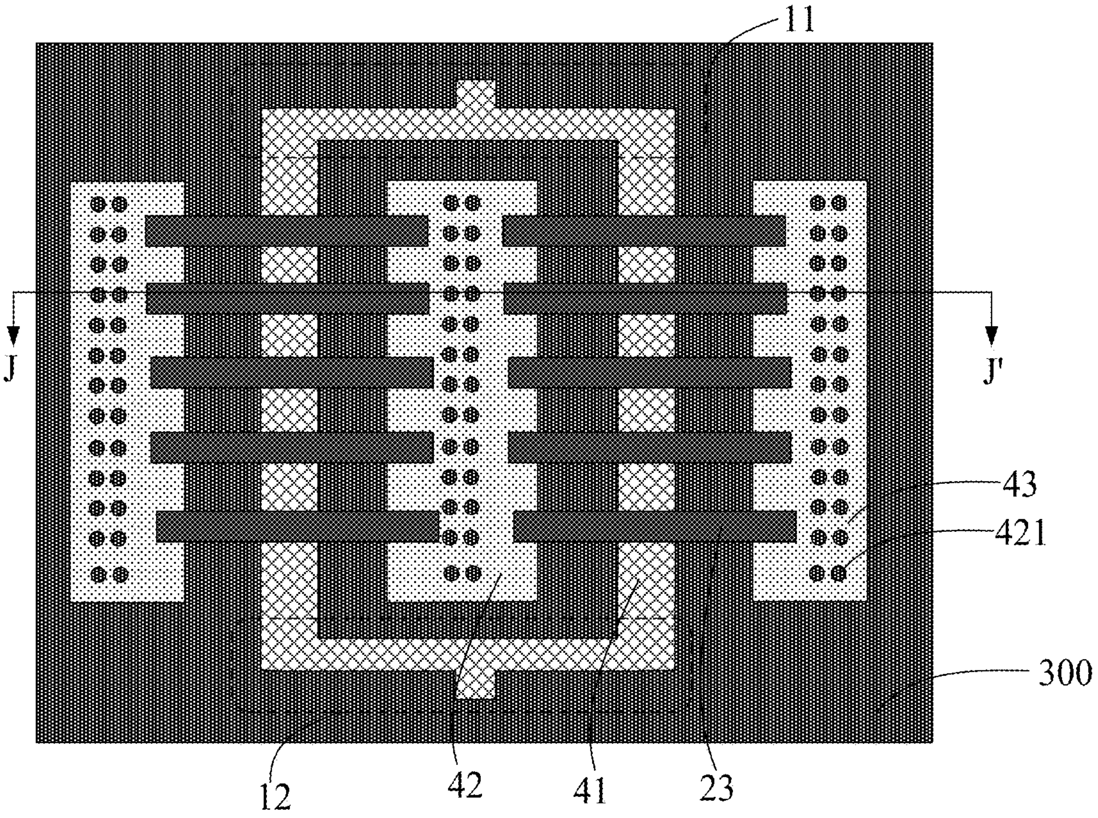
FIG. 21 is a top view of a phase shifter in a sixth example of embodiments of the present disclosure.
Figure 22:
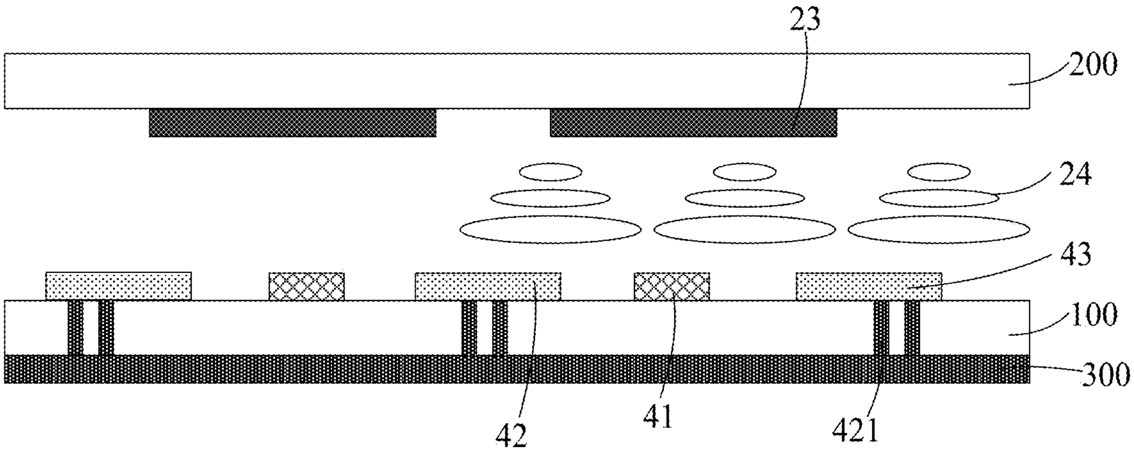
FIG. 22 is a cross-sectional view along a line J-J' in FIG. 21.

In a sixth example: FIG. 19 is a top view of a phase shifting unit 2 in a sixth example of embodiments of the present disclosure. FIG. 20 is a cross-sectional view along a line I-I' in FIG. 19. FIG. 21 is a top view of a phase shifter in a sixth example of embodiments of the present disclosure. FIG. 22 is a cross-sectional view along a line J-J' in FIG. 21. As shown in FIGS. 19 to 22, the phase shifter includes two phase shifting units 2 connected in parallel, each phase shifting unit 2 not only includes the first electrode layer and the second electrode layer, but also includes a third reference electrode 300 positioned on a side of the first dielectric substrate 100 away from the liquid crystal layer 24. The phase adjustment structure 203 in each phase shifting unit 2 is a single transmission line structure, and the first electrode layer of the phase adjustment unit includes a fourth reference electrode 42 and a fifth reference electrode 43 extending in the first direction and arranged side by side in the second direction, and a signal transmission line 41 located between the fourth reference electrode 42 and the fifth reference electrode 43. The second electrode layer includes first patch electrodes 23 arranged side by side along an extending direction of the signal transmission line 41; orthographic projections of the signal transmission line 41, the fourth reference electrode 42 and the fifth reference electrode 43 on the first dielectric substrate 100 all at least partially overlap with orthographic projections of the first patch electrodes 23 on the first dielectric substrate 100.

In some examples, every two adjacent phase shifting units 2 in the phase shifter form a group of phase shifting units 2; for a group of phase shifting units 2, the fourth reference electrode 42 of one phase shifting unit 2 is shared by the fifth reference electrode 43 of the other phase shifting unit 2. Thus, the whole structure of the phase shifter is more compact.

Figure 23:
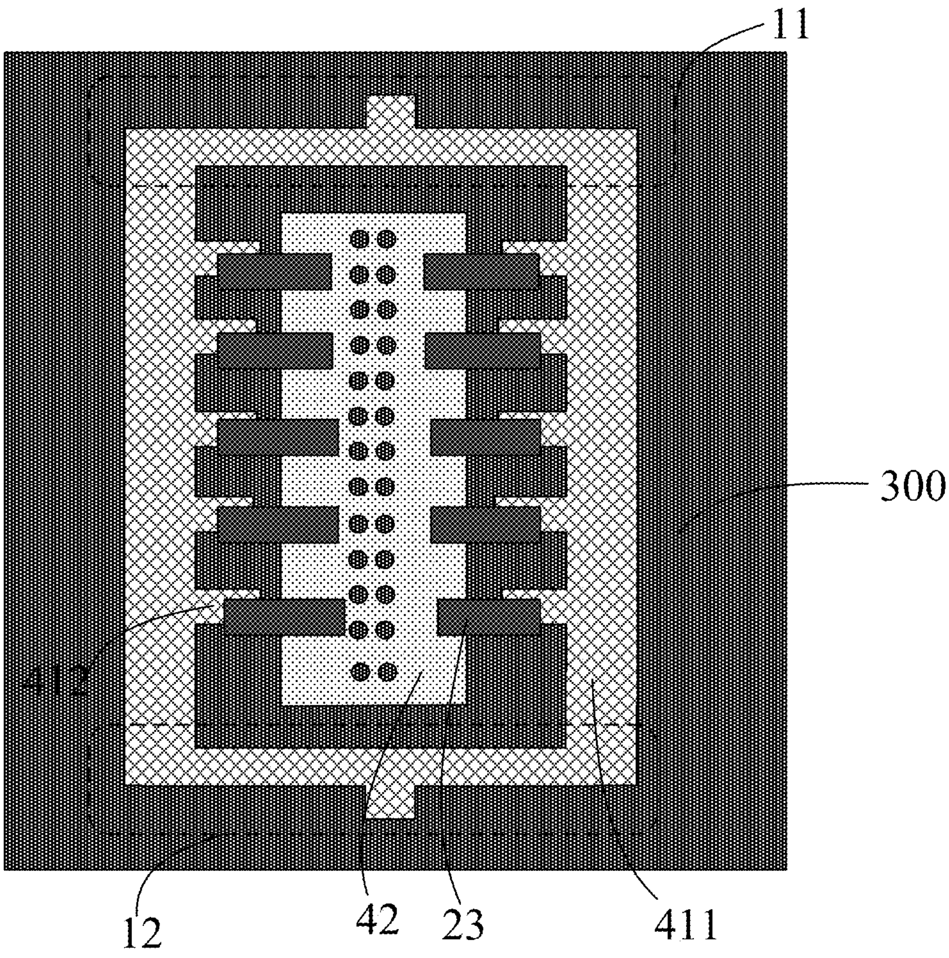
FIG. 23 is a top view of a phase shifter in a seventh example of embodiments of the present disclosure.

In a seventh example: FIG. 23 is a top view of a phase shifter in a seventh example of embodiments of the present disclosure. As shown in FIG. 23, the structure in the seventh example is substantially the same as that in the fifth example except that the signal transmission line 41 in each phase shifting unit 2 includes a main structure 411 and a plurality of branches 412 connected to the main structure 411 on a side of an extending direction of the main structure 411. For example: the branches 412 of the signal transmission line 41 and the first patch electrodes 23 are arranged in a one-to-one correspondence manner, and orthographic projections of a branch 412 and a first patch electrode 23 corresponding to each other on the first dielectric substrate 100 overlap with each other. The remaining structure in this example is the same as that in the fifth example, and therefore, the description thereof is not repeated.

Figure 24:
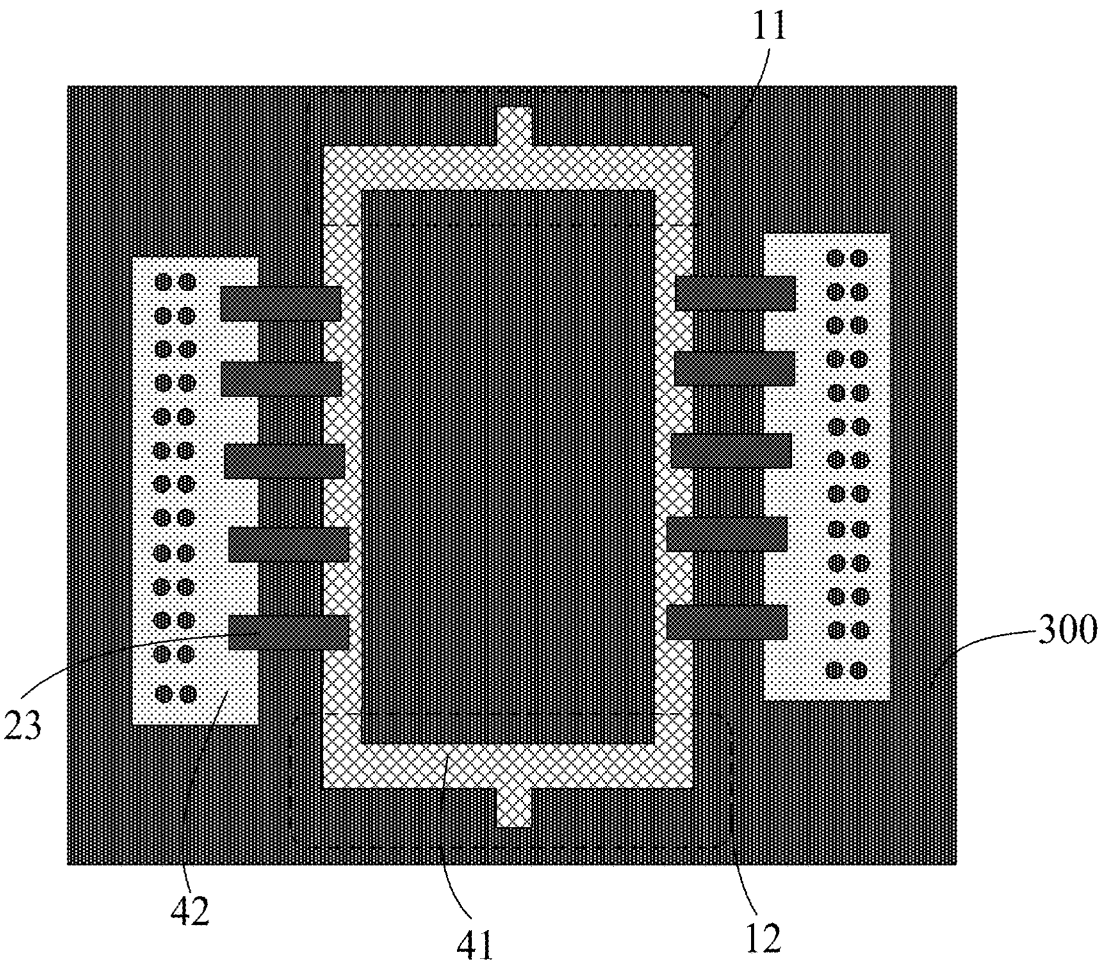
FIG. 24 is a top view of a phase shifter in an eighth example of embodiments of the present disclosure.
Figure 25:
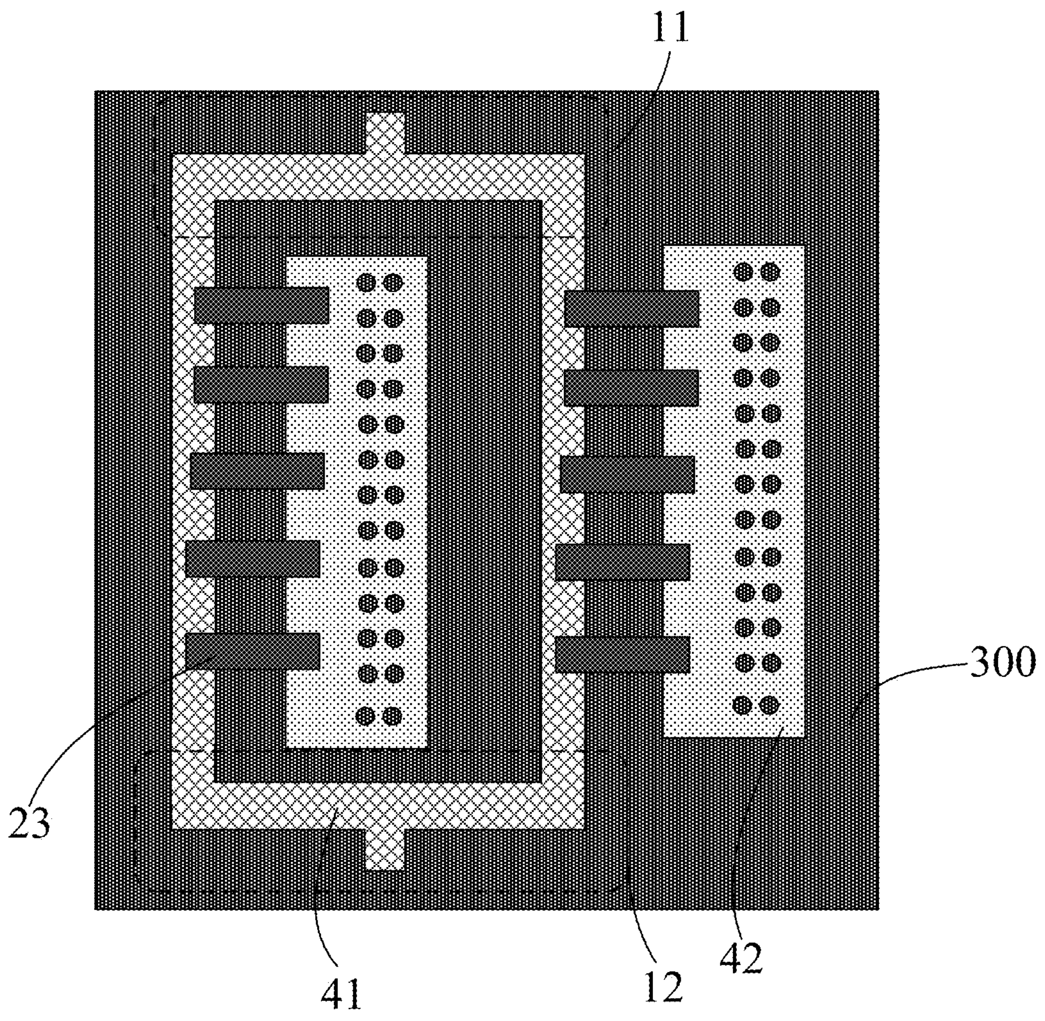
FIG. 25 is a top view of another phase shifter in an eighth example of embodiments of the present disclosure.

In an eighth example: FIG. 24 is a top view of a phase shifter in an eighth example of embodiments of the present disclosure. FIG. 25 is a top view of another phase shifter in an eighth example of embodiments of the present disclosure. As shown in FIGS. 24 and 25, the structure in the eighth example is substantially the same as that in the fifth example except that each signal transmission line 41 has a first side and a second side oppositely disposed in the second direction, the fourth reference electrode 42 in one phase shifting unit 2 is located on the first side of the signal transmission line 41, and the fourth reference electrode 42 in the other phase shifting unit 2 is located on the second side of the signal transmission line 41. In this case, the two fourth reference electrodes 42 in one group of phase shifting units 2 are not adjacent to each other.

Figure 26:
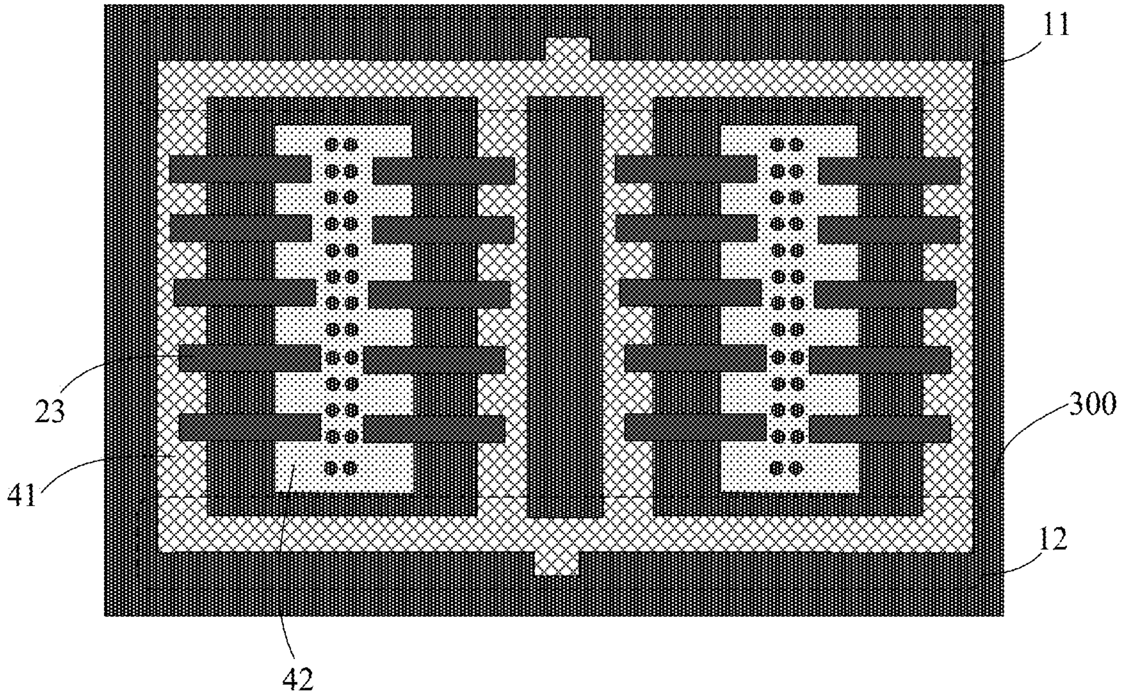
FIG. 26 is a top view of a phase shifter in a ninth example of embodiments of the present disclosure.

In a ninth example: FIG. 26 is a top view of a phase shifter in a ninth example of embodiments of the present disclosure. As shown in FIG. 26, the phase shifter in this example includes four phase shifting units 2, and each phase shifting unit 2 may have the same structure as the phase shifting unit 2 in the fifth example. Every two adjacent phase shifting units 2 form one group. That is, in this example, two groups of phase shifting units 2 are included, and the fourth reference electrode 42 in the same group of phase shifting units 2 is shared between the two phase shifting units included in the group of phase shifting units 2. In this example, since the phase shifter includes four phase shifting units 2, the first power division network 11 and the second power division network 12 may be each a one-to-four power divider. The remaining structure is the same as that in the fifth example, and thus, the description thereof is not repeated.

Figure 27:
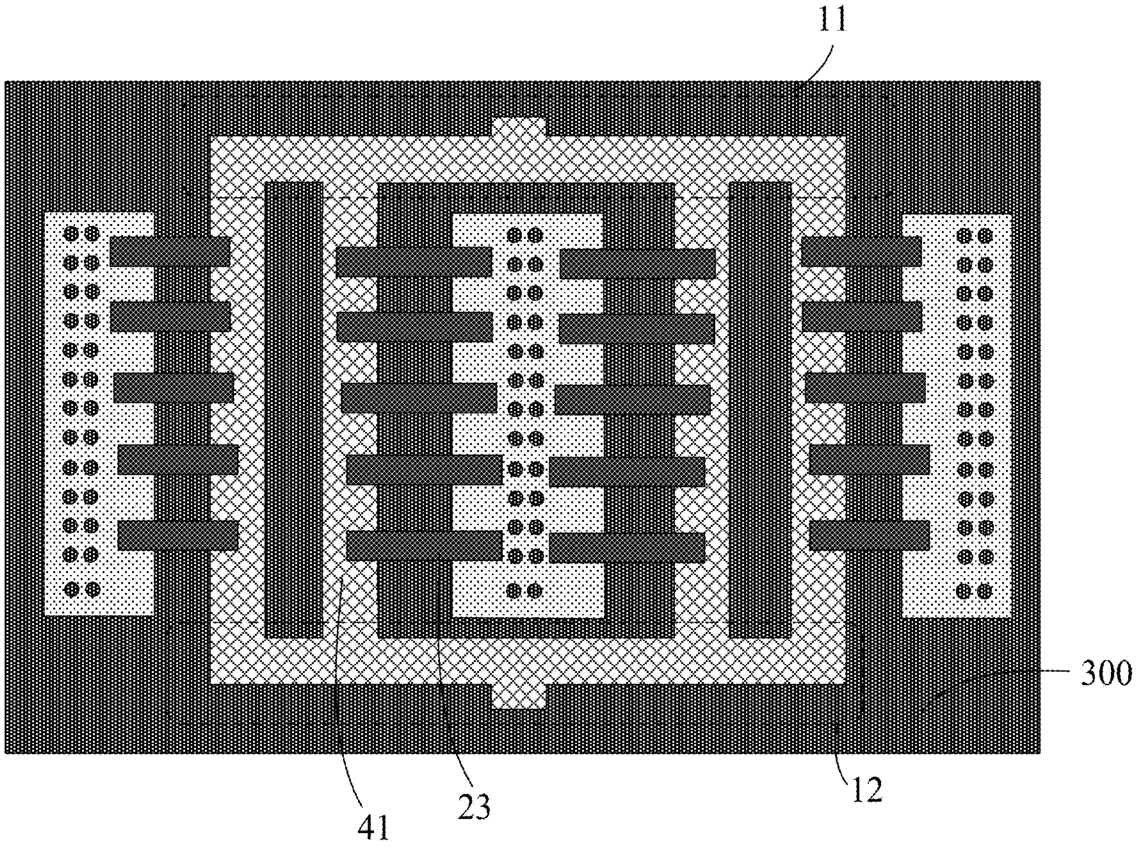
FIG. 27 is a top view of a phase shifter in a tenth example of embodiments of the present disclosure.
Figure 28:
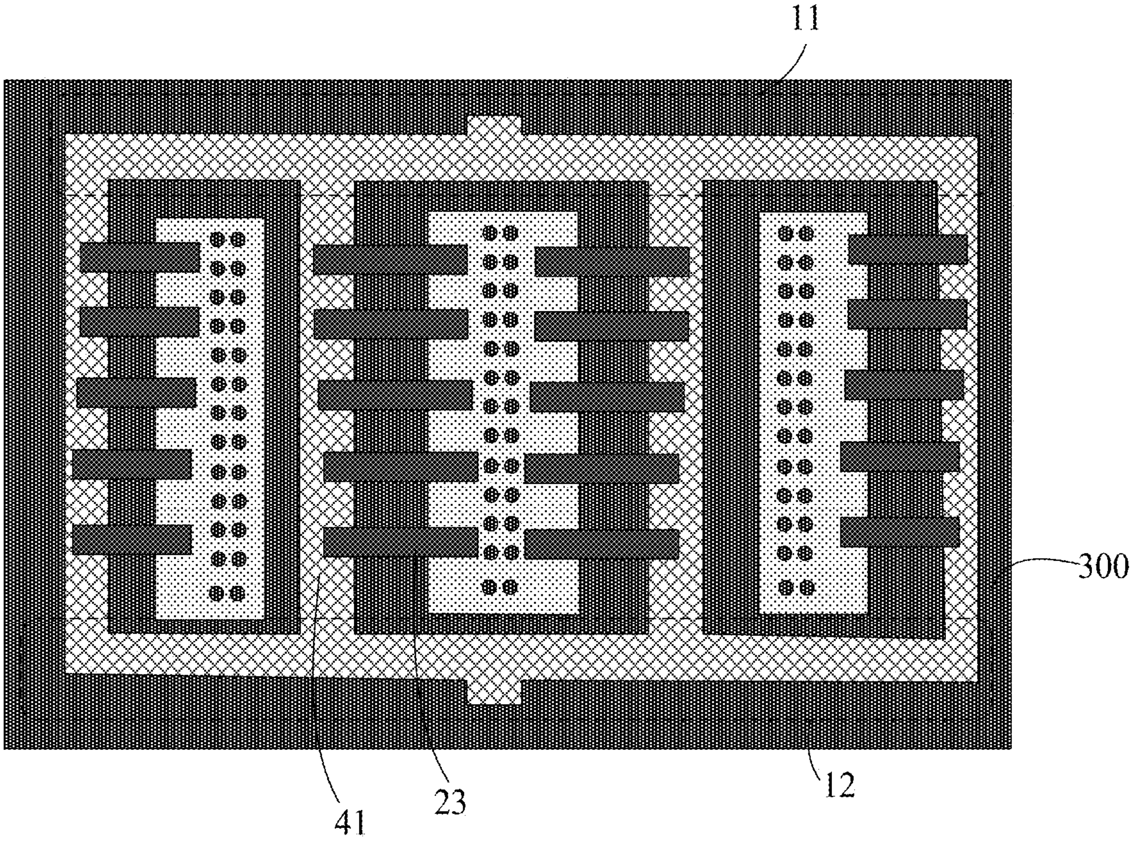
FIG. 28 is a top view of another phase shifter in a tenth example of embodiments of the present disclosure.

In a tenth example: FIG. 27 is a top view of a phase shifter in a tenth example of embodiments of the present disclosure. FIG. 28 is a top view of another phase shifter in a tenth example of embodiments of the present disclosure. As shown in FIGS. 27 and 28, the phase shifter in this example includes four phase shifting units 2, and each phase shifting unit 2 may have the same structure as the phase shifting unit 2 in the eighth example. Every two adjacent phase shifting units 2 form one group, i.e. in this example, two groups of phase shifting units 2 are included. The fourth reference electrode 42 adjacently disposed in the two groups of phase shifting units 2 is shared.

Figure 29:
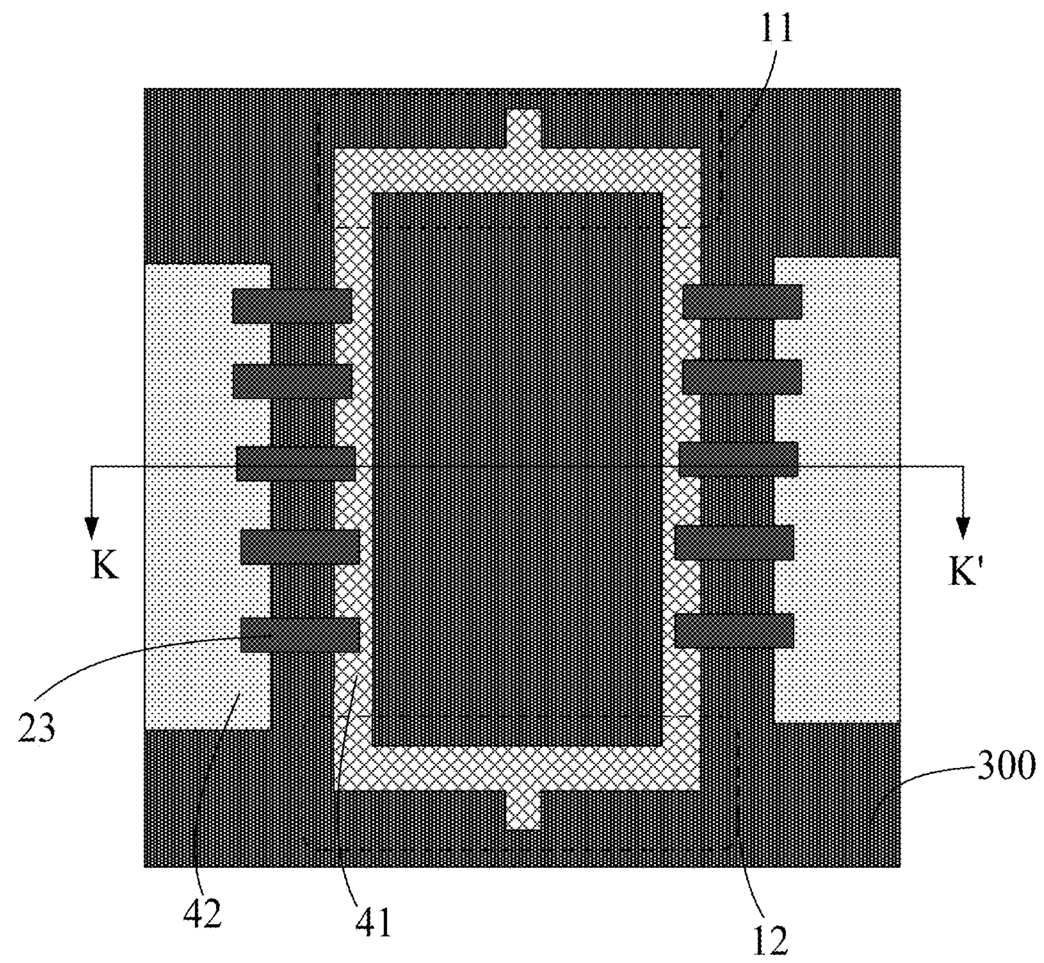
FIG. 29 is a top view of a phase shifter in an eleventh example of embodiments of the present disclosure.
Figure 30:
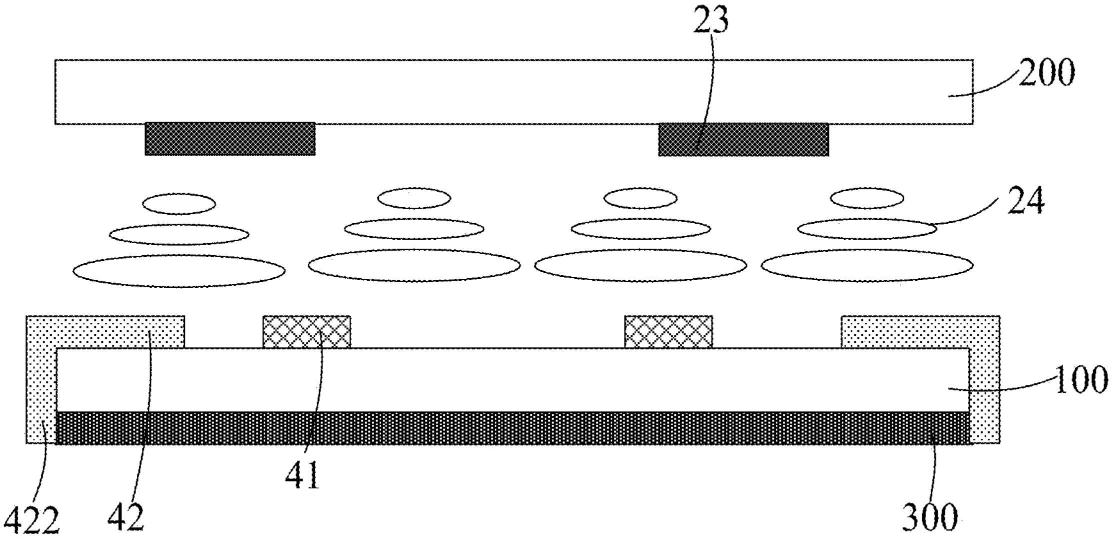
FIG. 30 is a cross-sectional view along a line K-K' in FIG. 29.

In an eleventh example: FIG. 29 is a top view of a phase shifter in an eleventh example of embodiments of the present disclosure. FIG. 30 is a cross-sectional view along a line K-K' in FIG. 29. As shown in FIGS. 29 and 30, the phase shifter in this example includes two phase shifting units 2 connected in parallel, and the phase shifter has substantially the same structure as the phase shifter shown in FIG. 21 except that the fourth reference electrode 42 in each phase shifting unit 2 is electrically connected to the third reference electrode 300 through a side trace 422. In this way, it is not required to form a connection via in the first dielectric substrate 100.

In some examples, the fourth reference electrode 42 and the side trace 422 may be formed in one step by an electroplating process, which is simple and easy to implement.

The other structures of the phase shifter in the eleventh example are substantially the same as those of the phase shifter in FIG. 21, and therefore, the description thereof will not be repeated.

Figure 31:
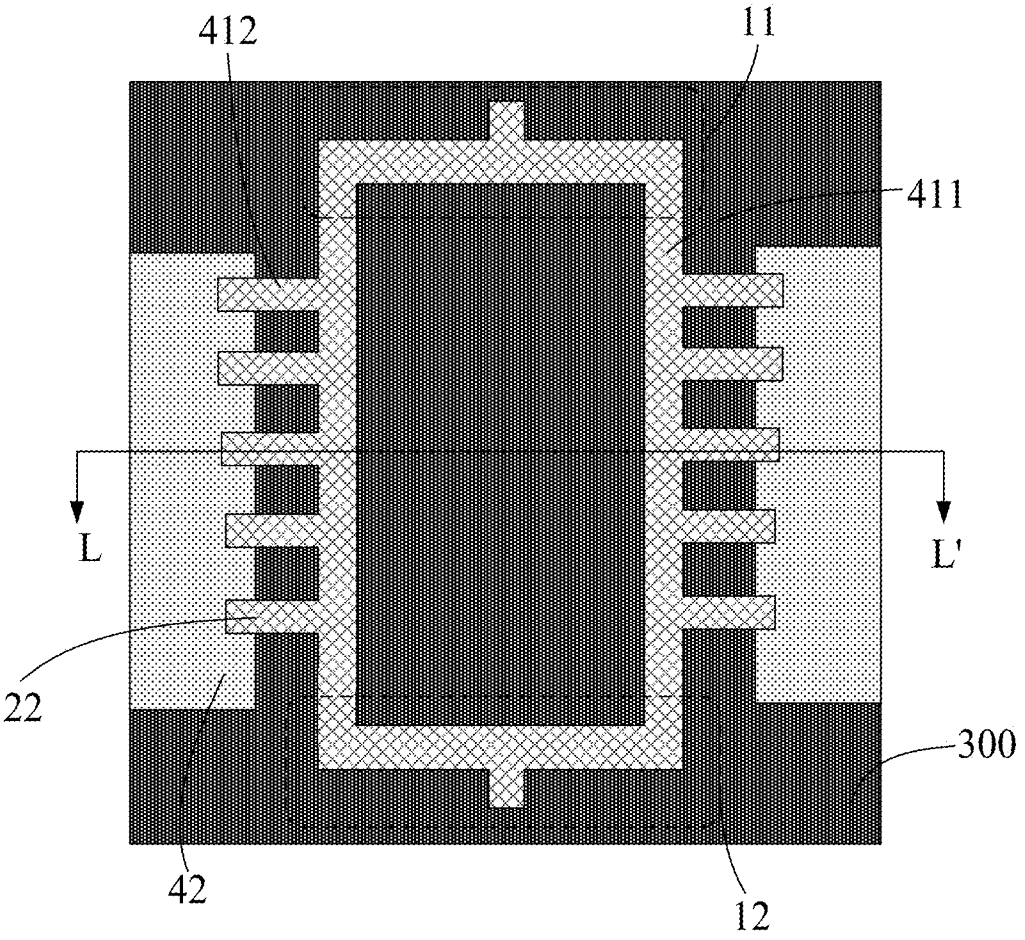
FIG. 31 is a top view of a phase shifter in a twelfth example of embodiments of the present disclosure.
Figure 32:
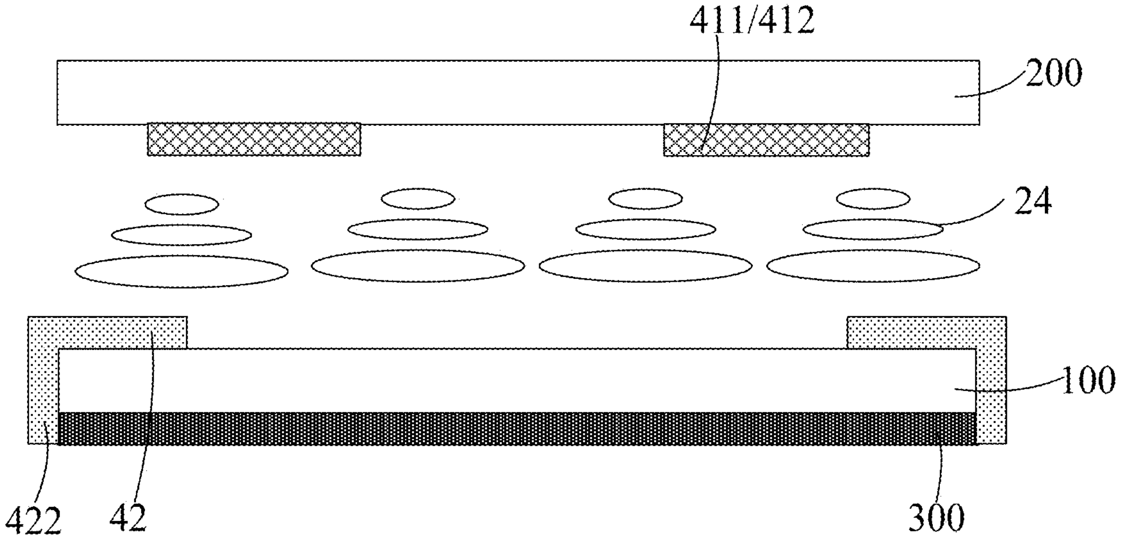
FIG. 32 is a cross-sectional view along a line L-L' in FIG. 31.

In a twelfth example: FIG. 31 is a top view of a phase shifter in a twelfth example of embodiments of the present disclosure. FIG. 32 is a cross-sectional view along a line L-L' in FIG. 31. As shown in FIGS. 31 and 32, the phase shifter in this example includes two phase shifting units 2 connected in parallel, the first electrode layer in each phase shifting unit 2 includes a fourth reference electrode 42, the second electrode layer includes a signal transmission line 41, the signal transmission line 41 includes a main structure 411 and a plurality of branches 412 connected to the main structure 411 on one side of an extending direction of the main structure 411, and orthographic projections of the branches 412 on the first dielectric substrate 100 at least partially overlap with an orthographic projection of the fourth reference electrode 42 on the first dielectric substrate 100 to form overlapping capacitors, so as to realize phase shifting for the microwave signal.

In some examples, the fourth reference electrode 42 in each phase shifting unit 2 is electrically connected to the third reference electrode 300 through the side trace 422. In this way, it is not required to form a connection via in the first dielectric substrate 100. Furthermore, the fourth reference electrode 42 and the side trace 422 may be formed in one step by an electroplating process, which is simple and easy to implement.

In some examples, the first power division network 11 and the second power division network 12 may be located in the second electrode layer, that is, disposed in the same layer as the signal transmission line 41, and may be made of the same material as the signal transmission line 41.

It should be noted that, only twelve exemplary phase shifter structures are given above. It should be understood that modifications on the basis of the above exemplary structures, such as, forming a phase shifter including a plurality of phase shifting units 2 connected in parallel, are all within the protection scope of the embodiments of the present disclosure.

In some examples, regardless of the phase shifter in the embodiments of the present disclosure adopting any one of the structures described above, the first power division network 11 and the second power division network 12 may each adopt a BALUN component. In the following, the first power division network 11 and the second power division network 12 are each of a one-to-two structure as an example.

Figure 33:
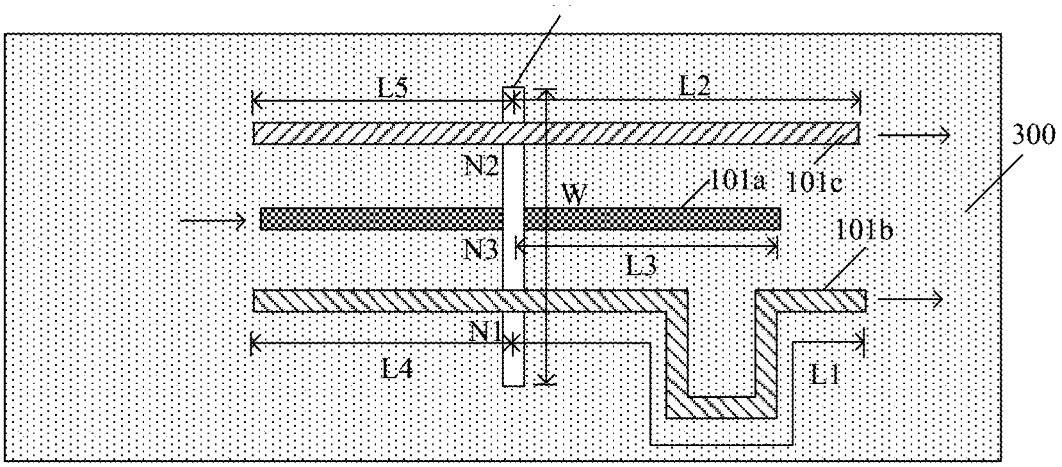
FIG. 33 is a schematic diagram of a BALUN component in a first example of embodiments of the present disclosure.

In a first example, FIG. 33 is a schematic diagram of a BALUN component in a first example of embodiments of the present disclosure. As shown in FIG. 33, the BALUN component may be arranged on a side of the first dielectric substrate 100 away from the liquid crystal layer 24. Specifically, an interlayer insulating layer may be disposed on a side of the first dielectric substrate 100 away from the third reference electrode 300; the third reference electrode 300 has a first opening 301 therein; the interlayer insulating layer is disposed on a side of the third reference electrode 300 away from the first dielectric substrate 100; a main line 101*a* of the BALUN component is disposed on a side of the interlayer insulating layer away from the third reference electrode 300, and an extending direction of the main line 101*a* intersects with an extending direction of the first opening 301. A first branch 101*b* and a second branch 101*c* of the BALUN component are both disposed on a second surface of the first dielectric substrate 100, and extending directions of main portions of the first branch 101*b* and the main line 101*a* also intersect with the extending direction of the first opening 301. Orthographic projections of the main line 101*a*, the first branch 101*b* and the second branch 101*c* on the first dielectric substrate 100 all intersect with an orthographic projection of the first opening 301 in the third reference electrode 300 on the first dielectric substrate 100, and the orthographic projections of the first branch 101*b* and the second branch 101*c* on the first dielectric substrate 100 limit the orthographic projection of the main line 101*a* on the first dielectric substrate 100 therebetween. In this BALUN component, the first branch 101*b* includes a meandering line, and an intersection of the orthographic projection of the first branch 101*b* on the first dielectric substrate 100 and the orthographic projection of the first opening 301 on the first dielectric substrate 100 is a first intersection N1, and an intersection of the orthographic projection of the second branch 101*c* on the first dielectric substrate 100 and the orthographic projection of the first opening 301 on the first dielectric substrate 100 is a second intersection N2; the first branch 101*b* and the second branch 101*c* both include a first end and a second end; a line length from the first intersection N1 of the first branch 101*b* to the second end of the first branch 101*b* is L1; a line length from the second intersection N2 of the second branch 101*c* to the second end of the second branch 101*c* is L2; and a difference between L1 and L2 is a half of a wavelength, so that the first branch 101*b* obtains a phase difference of 180° compared with the second branch 101*c*.

Figure 34:
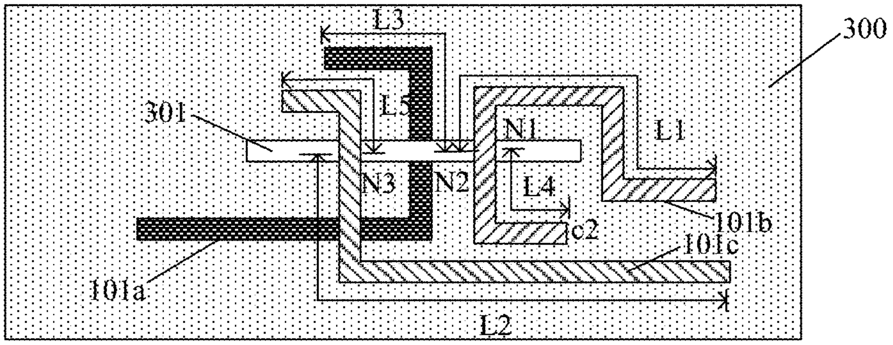
FIG. 34 is a schematic diagram of a BALUN component in a second example of embodiments of the present disclosure.

In a second example, FIG. 34 is a schematic diagram of a BALUN component in a second example of embodiments of the present disclosure. As shown in FIG. 34, the structure of this BALUN component is substantially the same as that in the first example, except that the main line 101*a*, the first branch 101*b*, and the second branch 101*c* in the BALUN component each include a meandering line. The main line 101*a*, the first branch 101*b* and the second branch 101*c* each include a first end and a second end. The intersections of the orthographic projections of the first branch 101*b*, the second branch 101*c* and the main line 101*a* on the first dielectric substrate 100 and the orthographic projections of the first opening 301 on the first dielectric substrate 100 are the first intersection point N1, the second intersection point N2 and a third intersection point N3, respectively. Orthographic projection of the first end of the first branch 101*b* and the first end of the second branch 101*c* on the first dielectric substrate 100 are located on different sides of the orthographic projection of the first opening 301 on the first dielectric substrate 100. Orthographic projection of the first end of the main line 101*a* and the first end of the second branch 101*c* on the first dielectric substrate 100 are on the same side of the orthographic projection of the first opening 301 on the first dielectric substrate 100. A line length from the second end of the main line 101*a* to the third intersection point N3 is L3; a line length from the first end of the first branch 101*b* to the first intersection point N1 is L4; a line length from the first end of the second branch 101*c* to the second intersection point N2 is L5, and L3, L4 and L5 are all approximately a quarter of a wavelength. A line length from the first intersection point N1 of the first branch 101*b* to the second end of the first branch 101*b* is L1; a line length from the second intersection point N2 of the second branch 101*c* to the second end of the second branch 101*c* is L2, and L1 and L2 are approximately equal to each other.

It should be noted that only two exemplary BALUN structures are given above, and the BALUN component in the embodiments of the present disclosure is not limited to these two structures.

The first dielectric substrate 100 and the second dielectric substrate 200 in the embodiments of the present disclosure may be glass substrates, plastic substrates, printed circuit boards (PCB), or the like.

Accordingly, in embodiments of the present disclosure, a method for manufacturing a phase shifter is further provided. By taking the phase shifter shown in FIG. 15 as an example, the method includes:

First, providing the first dielectric substrate 100, wherein the first dielectric substrate 100 is provided with connection vias extending through the first dielectric substrate along a thickness direction of the first dielectric substrate, and a first surface and a second surface oppositely arranged;

Second, forming a buffer layer on the first surface of the first dielectric substrate 100, where the buffer layer does not cover the connection vias. The buffer layer includes, but is not limited to, a silicon nitride layer, which may be formed through a chemical vapor deposition process. The buffer layer can effectively reduce the influence on the insertion loss of the phase shifter.

Third, forming a bias voltage line on the first dielectric substrate 100 on which the buffer layer is formed. The bias voltage line is made of, including, but not limited to, indium tin oxide, and may alternatively be made of metal, and may be specifically formed in combination with the formation of a driving array for the thin film transistor.

Fourth, forming a first electrode layer on the first dielectric substrate 100 on which the bias voltage line is formed. The first electrode layer includes the fourth reference electrode 42 and the signal transmission line 41. Specifically, a material of the first electrode layer may be copper, gold, silver, aluminum, or other metals. As an example, the material of the first electrode layer is copper in the embodiments of the present disclosure, this step may include forming a first seed layer by depositing copper with a certain thickness (such as around 3000 Å) through a sputter device, then depositing copper with a certain thickness (such as around 3 μm) by electroplating, and then forming a pattern including the first electrode layer through exposure, development, and etching.

Fifth, forming a negative stress layer on a side of the first electrode layer away from the first dielectric substrate 100. This step may include depositing one inorganic layer, such as SiN, SiO or SiON or the like, with a thickness in a range from 1000 Å to 2000 Å by a PECVD device and then patterning the negative stress layer by exposure, development, etching processes. The negative stress layer is mainly used for preventing the first electrode layer from being oxidized.

Sixth, forming a layer of the third reference electrode 300 on the second surface of the first dielectric substrate 100. Specifically, the process of the fourth step may be adopted.

Seventh, forming the first patch electrodes 23 on the second dielectric substrate 200. Specifically, the process of the fourth step may be adopted.

Eighth, forming a spacer on the first dielectric substrate 100 or the second dielectric substrate 200. The spacer may be made of an organic resin material and have a height in a range from 1 μm to 100 μm.

Ninthly, coating PI liquid on the first dielectric substrate 100 and the second dielectric substrate 200, respectively, then curing the PI liquid to form a film, and then performing an OA process; and finally, coating a frame sealing glue on the periphery of the device, dripping liquid crystals and performing an aligning and assembling process, to complete the manufacturing of the whole phase shifter.

Figure 35:
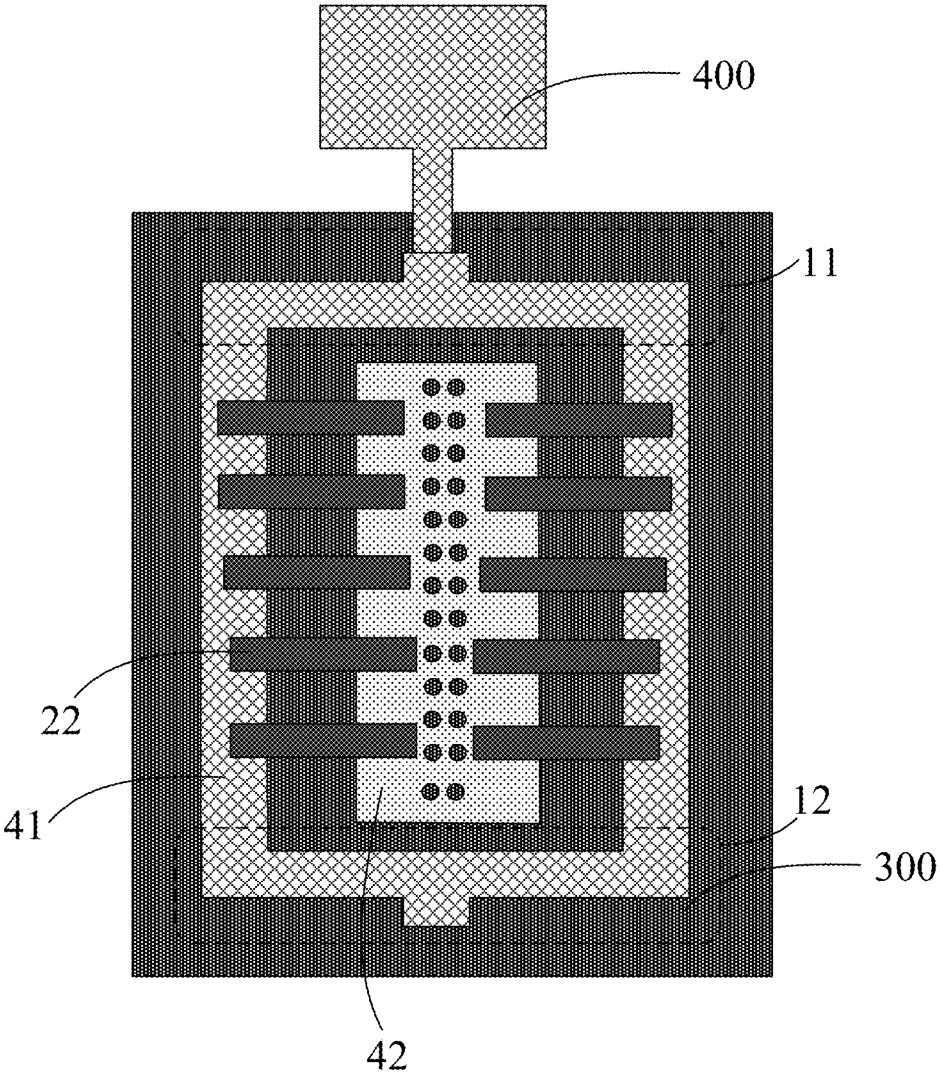
FIG. 35 is a schematic diagram of an antenna according to embodiments of the present disclosure.

In a second aspect, FIG. 35 is a schematic diagram of an antenna according to embodiments of the present disclosure. As shown in FIG. 35, the present disclosure provides an antenna, which may include the antenna in any one of the above embodiments.

The antenna in the embodiments of the present disclosure includes any one of a radiating antenna, a dipole, and a slot antenna.

For example: the antenna in the embodiments of the present disclosure is the radiating antenna, which may further include a radiating structure 400. The radiating structure 400 is electrically connected to the phase shifter. For example: the radiating structure 400 is electrically connected to the first feeding port of the first power division network 11 in the phase shifter, or the third feeding port of the second power division network 12 in the phase shifting structure. Alternatively, both the first feeding port of the first power division network 11 and the third feeding port of the second power division network 12 in the phase shifter are electrically connected to one radiating structure 400.

In some examples, the radiating structure 400 and the first/third feeding port may be directly electrically connected, or coupled to each other, or connected to each other by a slit coupling, which depends on a relative position between the radiating structure 400 and the first/third feeding port.

In a third aspect, embodiments of the present disclosure provide an electronic device, which may include the antenna described above. The electronic device provided by the embodiments of the present disclosure further includes a transceiver unit, a radio frequency transceiver, a signal amplifier, a power amplifier, and a filtering unit. The antenna in the electronic device may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the electronic device and is processed by the filtering unit, the power amplifier, the signal amplifier, and the radio frequency transceiver, the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the electronic device, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the electronic device, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising a plurality of phase shifting units, a first power division network and a second power division network; wherein each phase shifting unit comprises a first transmission structure and a second transmission structure; the first power division network comprises a first feeding port and a plurality of second feeding ports; the second power division network comprises a third feeding port and a plurality of fourth feeding ports; and the first transmission structure of the phase shifting unit is electrically connected to one second feeding port; the second transmission structure of the phase shifting unit is electrically connected to one fourth feeding port.

2. The phase shifter according to claim 1, wherein the phase shifter comprises a first dielectric substrate and a second dielectric substrate opposite to each other; the phase shifting unit further comprises a phase adjustment structure connected between the first transmission structure and the second transmission structure; and the phase adjustment structure comprises a first electrode layer on a side of the first dielectric substrate close to the second dielectric substrate, a second electrode layer on a side of the second dielectric substrate close to the first dielectric substrate, and a tunable dielectric layer between the first electrode layer and the second electrode layer; orthographic projections of the first electrode layer and the second electrode layer on the first dielectric substrate at least partially overlap with each other.

3. The phase shifter according to claim 2, wherein the first electrode layer comprises a first transmission line and a second transmission line arranged side by side; the second electrode layer comprises a plurality of first patch electrodes arranged side by side along an extending direction of the first transmission line; orthographic projections of the first transmission line and the second transmission line on the first dielectric substrate at least partially overlap with an orthographic projection of each first patch electrode on the first dielectric substrate.

4. The phase shifter according to claim 2, wherein the first electrode layer comprises a first transmission line and a plurality of first branches electrically connected to the first transmission line, the plurality of first branches are arranged at intervals and are connected to the first transmission line on one side of an extending direction of the first transmission line; the second electrode layer comprises a second transmission line and a plurality of second branches electrically connected to the second transmission line, and the plurality of second branches are arranged at intervals and are connected to the second transmission line on one side of an extending direction of the second transmission line; an orthographic projection of one first branch on the first dielectric substrate at least partially overlaps with an orthographic projection of one corresponding second branch on the first dielectric substrate.

5. The phase shifter according to claim 2, wherein the first electrode layer comprises a first reference electrode and a second reference electrode arranged side by side, and a signal electrode between the first reference electrode and the second reference electrode; the second electrode layer comprises a plurality of first patch electrodes arranged side by side along an extending direction of the signal electrode; and orthographic projections of the plurality of first patch electrodes on the first dielectric substrate overlap with an orthographic projection of each of the first reference electrode, the second reference electrode and the signal electrode on the first dielectric substrate.

6. The phase shifter according to claim 5, wherein the first reference electrode of one of two adjacent phase shifting units is shared by the second reference electrode of the other one of the two adjacent phase shifting units.

7. The phase shifter according to claim 2, wherein the first electrode layer comprises a first reference electrode and a second reference electrode arranged side by side, and a signal electrode between the first reference electrode and the second reference electrode; the second electrode layer comprises a plurality of first patch electrodes arranged side by side along an extending direction of the signal electrode; each first patch electrode comprises a first sub-patch and a second sub-patch disconnected from each other; an orthographic projection of the first sub-patch on the first dielectric substrate at least partially overlap with orthographic projections of the first reference electrode and the signal electrode on the first dielectric substrate; an orthographic projection of the second sub-patch on the first dielectric substrate at least partially overlap with orthographic projections of the second reference electrode and the signal electrode on the first dielectric substrate.

8. The phase shifter according to claim 2, wherein the first electrode layer comprises a first reference electrode and a second reference electrode arranged side by side, a plurality of third branches arranged at intervals and electrically connected to the first reference electrode and on one side of an extending direction of the first reference electrode, and a plurality of fourth branches arranged at intervals and electrically connected to the second reference electrode and on one side of an extending direction of the second reference electrode; the plurality of third branches and the plurality of fourth branches are between the first reference electrode and the second reference electrode; and the second electrode layer comprises a signal electrode, and fifth branches and sixth branches electrically connected to the signal electrode and on two sides of an extending direction of the signal electrode; an orthographic projection of one third branch on the first dielectric substrate at least partially overlaps with an orthographic projection of one corresponding fifth branch on the first dielectric substrate, and an orthographic projection of one fourth branch on the first dielectric substrate at least partially overlaps with an orthographic projection of one corresponding sixth branch on the first dielectric substrate.

9. The phase shifter according to claim 2, wherein the phase shifting unit further comprises a third reference electrode on a side of the first dielectric substrate away from the first electrode layer; the first electrode layer comprises a signal transmission line and a fourth reference electrode which are arranged side by side; the second electrode layer comprises a plurality of first patch electrodes arranged side by side along an extending direction of the signal transmission line; an orthographic projection of each of the signal electrode and the fourth reference electrode on the first dielectric substrate at least partially overlaps with orthographic projections of the plurality of first patch electrodes on the first dielectric substrate.

10. The phase shifter according to claim 9, wherein every two adjacent phase shifting units form a group of phase shifting units; in the group of phase shifting units, two fourth reference electrodes are between two signal transmission lines, or the fourth reference electrode in each phase shifting unit is on a side of the signal transmission line away from the adjacent phase shifting unit, or only one fourth reference electrode is between two signal transmission lines.

11. The phase shifter according to claim 10, wherein two fourth reference electrodes of a group of phase shifting units are between two signal transmission lines; and the two fourth reference electrodes are formed into a single piece to be shared between the two adjacent phase shifting units in the group of phase shifting units.

12. The phase shifter according to claim 9, wherein the signal transmission line comprises a main structure and a plurality of branches connected to the main structure on one side of an extending direction of the main structure; an orthographic projection of one branch on the first dielectric substrate overlaps with an orthographic projection of one corresponding first patch electrode on the first dielectric substrate.

13. The phase shifter according to claim 9, wherein the fourth reference electrode and the third reference electrode are electrically connected to each other through a connection via extending through the first dielectric substrate.

14. The phase shifter according to claim 13, wherein the connection via is filled with a connection electrode, and the fourth reference electrode and the third reference electrode are electrically connected to each other through the connection electrode.

15. The phase shifter according to claim 9, wherein the fourth reference electrode and the third reference electrode are electrically connected to each other by a trace on a lateral side of the first dielectric substrate.

16. The phase shifter according to claim 2, wherein the phase shifting unit further comprises a third reference electrode on a side of the first dielectric substrate away from the first electrode layer; the first electrode layer comprises a fourth reference electrode and a fifth reference electrode which are arranged side by side, and a signal transmission line between the fourth reference electrode and the fifth reference electrode; the second electrode layer comprises a plurality of first patch electrodes arranged side by side along an extending direction of the signal transmission line; an orthographic projection of each of the signal electrode transmission line, the fourth reference electrode and the fifth reference electrode on the first dielectric substrate at least partially overlaps with orthographic projections of the first patch electrodes on the first dielectric substrate.

17. The phase shifter according to claim 16, wherein every two adjacent phase shifting units form a group of phase shifting units; in a group of phase shifting units, the fourth reference electrode of one phase shifting unit is shared by the fifth reference electrode of the other phase shifting unit.

18. An antenna, comprising the phase shifter according to claim 1.

19. The antenna according to claim 18, further comprising a radiating structure electrically connected to the phase shifter.

20. An electronic device, comprising the antenna according to claim 18.

* * * * *